United States Patent
Rosenband et al.

(10) Patent No.: US 10,033,456 B2
(45) Date of Patent: *Jul. 24, 2018

(54) DEVICES AND METHODS FOR A ROTARY JOINT WITH MULTIPLE WIRELESS LINKS

(71) Applicant: Waymo LLC, Mountain View, CA (US)

(72) Inventors: Daniel L. Rosenband, San Jose, CA (US); Pierre-Yves Droz, Los Altos, CA (US); Min Wang, Santa Clara, CA (US); Etai Bruhis, Palo Alto, CA (US); Adam Brown, Mountain View, CA (US); Samuel William Lenius, Sunnyvale, CA (US)

(73) Assignee: Waymo LLC, Mountain View, CA (US)

(*) Notice: Subject to any disclaimer, the term of this patent is extended or adjusted under 35 U.S.C. 154(b) by 7 days.

This patent is subject to a terminal disclaimer.

(21) Appl. No.: 15/454,375

(22) Filed: Mar. 9, 2017

(65) Prior Publication Data
US 2017/0214458 A1 Jul. 27, 2017

Related U.S. Application Data

(63) Continuation of application No. 15/006,844, filed on Jan. 26, 2016, now Pat. No. 9,628,170.

(51) Int. Cl.
*H04B 1/38* (2015.01)
*H04B 7/24* (2006.01)

(52) U.S. Cl.
CPC ....................................... *H04B 7/24* (2013.01)

(58) Field of Classification Search
CPC ....................................................... H04B 7/24
(Continued)

(56) References Cited

U.S. PATENT DOCUMENTS

| 2012/0242428 A1* | 9/2012 | Blech ...................... H01P 1/065 333/257 |
| 2014/0099890 A1* | 4/2014 | Lichter .................... H04B 5/02 455/41.1 |

(Continued)

FOREIGN PATENT DOCUMENTS

| JP | 2015528909 A | 10/2015 |
| WO | 2008104998 | 9/2008 |

(Continued)

OTHER PUBLICATIONS

International Search Report and Written Opinion of corresponding International Application No. PCT/US2017/014275 (dated May 11, 2017).

*Primary Examiner* — April G Gonzales
(74) *Attorney, Agent, or Firm* — McDonnell Boehnen Hulbert & Berghoff LLP

(57) ABSTRACT

A device is provided that includes a first platform having a first side, and a second platform having a second side positioned within a predetermined distance to the first side. The device also includes an actuator configured to cause a relative rotation between the first platform and the second platform such that the first side of the first platform remains within the predetermined distance to the second side of the second platform. The device also includes a probe mounted to the first platform, and a plurality of probes mounted to the second platform. The device also includes a signal conditioner coupled to the plurality of probes. The signal conditioner may select one of the plurality of probes based on an orientation of the first platform relative to the second platform. The signal conditioner may then to use the selected probe for wireless communication with the probe on the first platform.

20 Claims, 12 Drawing Sheets

(58) Field of Classification Search
USPC .......................................................... 455/90.2
See application file for complete search history.

(56) References Cited

U.S. PATENT DOCUMENTS

2014/0142436 A1* 5/2014 Hutchins .............. A61B 5/0035
600/478
2015/0311587 A1* 10/2015 Kaplan .................... H01Q 3/04
343/766

FOREIGN PATENT DOCUMENTS

| WO | 2008104998 A2 | 9/2008 |
| WO | 2015094802 | 6/2015 |

* cited by examiner

DEVICES AND METHODS FOR A ROTARY JOINT WITH MULTIPLE WIRELESS LINKS

CROSS-REFERENCE TO RELATED APPLICATION

This application is a continuation of U.S. application Ser. No. 15/006,844, filed Jan. 26, 2016, the contents of which are entirely incorporated herein by reference as if fully set forth in this application.

BACKGROUND

Unless otherwise indicated herein, the materials described in this section are not prior art to the claims in this application and are not admitted to be prior art by inclusion in this section.

Rotary joint devices are often used for transmission of power and/or electrical signals between one structure and another structure in an electromechanical system that operates by causing a relative rotation between the two structures (e.g., stator and rotor). Example systems that employ rotary joint devices include remote sensing systems (e.g., RADARs, LIDARs, etc.) and robotic systems (e.g., for directing microphones, speakers, other robotic components, etc.), among other possibilities.

A slip ring joint is an example rotary joint device that typically involves a conducting brush disposed in one structure remaining in contact with a conducting ring disposed in the other structure as the rotor rotates. Slip ring joints may be associated with high maintenance and/or production costs due to the damaging effect of friction between the brush and the ring as the rotor rotates.

An optical rotary joint is an example rotary joint device that typically involves a light source disposed in one structure that emits modulated light indicative of transmitted data towards a photodetector disposed in the other structure. Optical rotary joints may be associated with data transmission rate limitations due to an extent of possible light modulations that can be uniquely detected by the photodetector.

A radio-frequency (RF) rotary joint is an example rotary joint device that typically involves an antenna disposed in one structure that emits RF electromagnetic waves towards another antenna disposed in the other structure. RF rotary joints may be associated with data transmission rate limitations due to the relative motion between the two antennas as the rotor rotates. By way of example, the relative motion between the two antennas may cause variations in polarizations of the respective antennas, mismatches between beamforming patterns of the respective antennas, or distance variations between the respective antennas, among other possibilities. As a result, the relative rotation between the two structures may affect the quality of wireless communication between the two antennas. Thus, due to the relative rotation between the two structures, the available RF bandwidth for reliable wireless data transmission between the two antennas may be reduced.

SUMMARY

In one example, a device is provided that includes a first platform having a first side. The device also includes a second platform having a second side positioned within a predetermined distance to the first side of the first platform. The device also includes an actuator configured to rotate the first platform relative to the second platform. The first side of the first platform may remain within the predetermined distance to the second side of the second platform in response to the actuator rotating the first platform. The device also includes a probe mounted to the first platform and configured to emit a wireless signal for propagation toward the second side of the second platform. The device also includes a plurality of probes mounted to the second platform in a substantially circular arrangement. The device also includes a signal conditioner electrically coupled to the plurality of probes. The signal conditioner may be configured to select one of the plurality of probes based on an orientation of the first platform relative to the second platform. The signal conditioner is configured to use the selected probe for receiving the wireless signal emitted by the probe of the first platform.

In another example, a method is provided that involves transmitting, using a probe mounted to a first platform having a first side, a wireless signal toward a second side of a second platform positioned within a predetermined distance to the first side of the first platform. A plurality of probes may be mounted to the second platform. The method also involves rotating the first platform relative to the second platform. The first side of the first platform may remain within the predetermined distance to the second side of the second platform in response to the rotating. The method also involves selecting one of the plurality of probes on the second platform based on an orientation of the first platform relative to the second platform. The method also involves using the selected probe to receive the wireless signal transmitted by the probe on the first platform.

In yet another example, a device is provided that includes a first platform having a first side. The device also includes a second platform having a second side positioned within a predetermined distance to the first side of the first platform. The device also includes an actuator configured to cause a relative rotation between the first platform and the second platform. The first side of the first platform may remain within the predetermined distance to the second side of the second platform in response to the actuator causing the relative rotation. The device also includes a probe mounted to the first platform. The device also includes a plurality of probes mounted to the second platform in a substantially circular arrangement. The device also includes a signal conditioner electrically coupled to the plurality of probes. The signal conditioner is configured to select one of the plurality of probes based on an orientation of the first platform relative to the second platform. The signal conditioner is configured to use the selected probe for wireless communication with the probe on the first platform.

In still another example, a system is provided that includes means for transmitting, via a probe mounted to a first platform having a first side, a wireless signal toward a second side of a second platform positioned within a predetermined distance to the first side of the first platform. A plurality of probes may be mounted to the second platform. The system also comprises means for rotating the first platform relative to the second platform. The first side of the first platform may remain within the predetermined distance to the second side of the second platform in response to the rotating. The system also comprises means for selecting one of the plurality of probes on the second platform based on an orientation of the first platform relative to the second platform. The system also comprises means for using the selected probe to receive the wireless signal transmitted by the probe on the first platform.

These as well as other aspects, advantages, and alternatives, will become apparent to those of ordinary skill in the art by reading the following detailed description, with reference where appropriate to the accompanying figures.

DETAILED DESCRIPTION

Figure 1A:
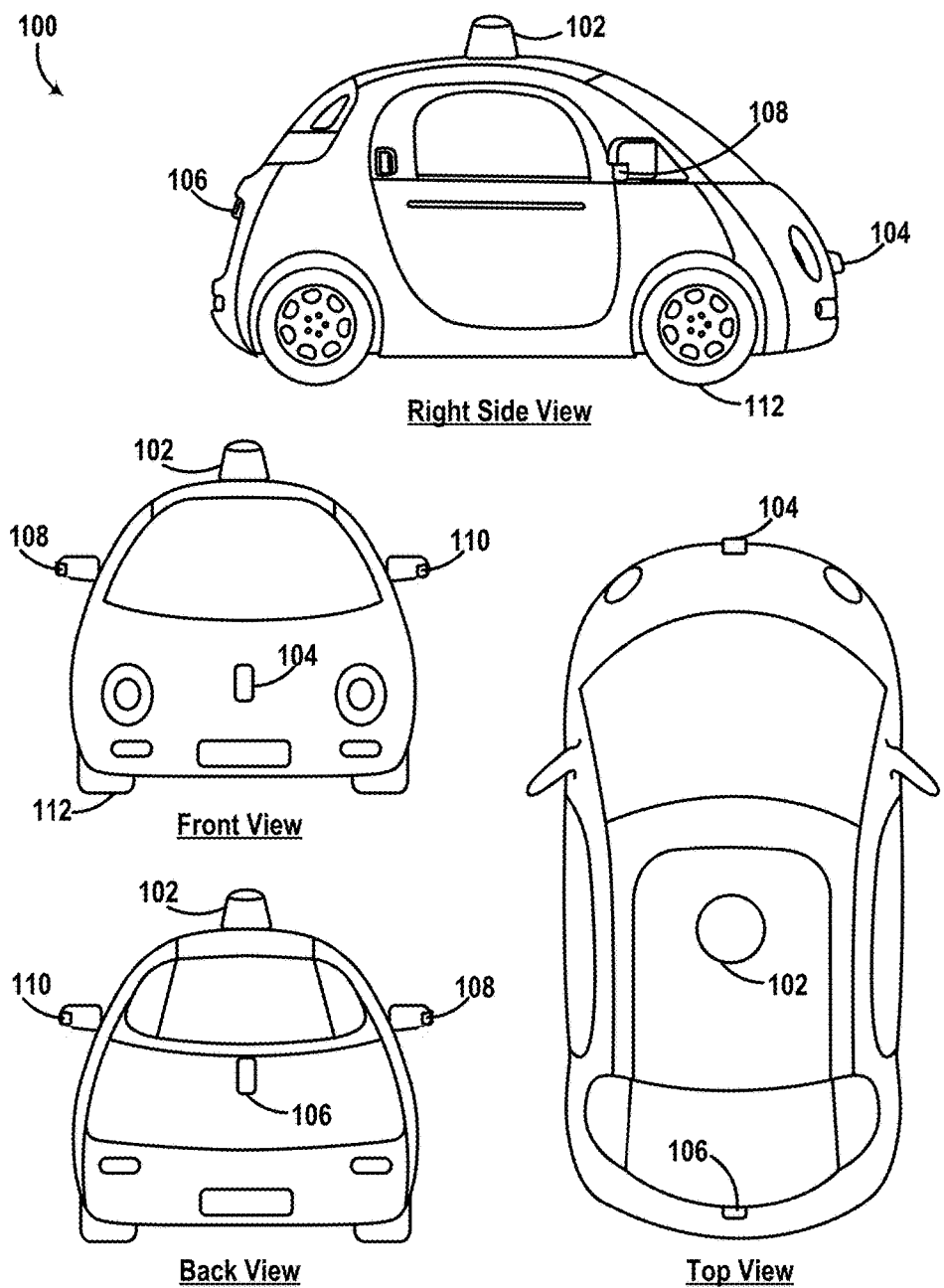
FIG. 1A illustrates a vehicle, according to an example embodiment.

The following detailed description describes various features and functions of the disclosed systems, devices and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

I. OVERVIEW

In an example embodiment, a rotary joint is provided that includes two platforms arranged such that a first side of a first platform remains within a predetermined distance to a second side of a second platform in response to a relative rotation between the two platforms. In one example, the two platforms may be circularly shaped disks arranged concentrically about a common axis of the respective disks to maintain an overlap between the two respective sides separated by the predetermined distance in response to rotation of any of the two platforms about the common axis. Other configurations are possible as well.

In this embodiment, the first platform could mount a probe configured to transmit wireless signals towards the second platform, and/or to receive wireless signals propagating towards the first platform (e.g., through the gap between the two platforms). In one instance, the probe could be mounted on the first side of the first platform adjacent to the second side of the second platform. In another instance, the probe could be mounted on another side of the platform (e.g., opposite to the first side, etc.). Further, the second platform could mount a plurality of probes in a substantially circular arrangement. Thus, for example, as the first platform rotates relative to the second platform (or vice versa), one of the plurality of probes on the second platform may align with the probe on the first platform due to the circular arrangement. For example, the circular arrangement could be chosen so that the probe on the first platform at least partially overlaps with one of the probes on the second platform when that second platform probe is aligned with the first platform probe.

Further, in this embodiment, the rotary joint may include a signal conditioner, such as any combination of analog or digital circuitry or microprocessors or the like, electrically coupled to the probes on the second platform. The signal conditioner could be configured to select one of the probes on the second platform based on an orientation of the first platform relative to the second platform. For example, the signal conditioner could select the probe on the second platform having the strongest signal strength, or the second platform probe that is within the shortest distance to the probe on the first platform. Thus, in some examples, the signal conditioner could determine an indication of the orientation based on signal strengths of the probes on the second platform. Further, in other examples, the signal conditioner could use orientation sensors, such as encoders, photodetectors, and the like, for determining the orientation or an indication of the orientation (e.g., range of orientations, etc.).

The signal conditioner could then use the selected probe on the second platform for wireless communication with the first probe on the second platform. Thus, for example, the rotary joint could switch between the probes on the second platform and use the probe having the best conditions (e.g., polarization alignment, distance, signal strength, etc.) for communicating with the probe on the first platform as the two platform rotate with respect to one another.

Through this process, for example, the rotary joint could improve the reliability and communication bandwidth between the two platforms. Further, since multiple probes are used for short distance wireless communication, in some embodiments, the various probes described above could also use high radio-frequencies, such as those in the extremely high frequency band (EHF) or higher (i.e., greater than 3 Gigahertz (GHz)), as the short distance wireless links achieved by switching between multiple links in accordance with the present disclosure may be suitable for continuous (or intermittent) high-speed communication using these higher frequencies. Whereas, for example, traditional RF rotary joints may be less suitable for using these higher frequencies due to the rotational movement between the moving antennas, as well as the high path loss associated with these higher frequencies. Thus, the devices and methods herein could also provide data throughput improvements over traditional RF rotary joints.

II. ILLUSTRATIVE ELECTROMECHANICAL SYSTEMS AND DEVICES

Systems and devices in which example embodiments may be implemented will now be described in greater detail. In general, the embodiments disclosed herein can be used with any electromechanical system that includes a moveable component. The system can provide for transmission of power and/or signals between the moveable component and other parts of the system. Illustrative embodiments described herein include vehicles that have moveable components such as sensors and wheels that communicate with other components of the vehicle and/or with one another. However, an example electromechanical system may also be implemented in or take the form of other devices, such as sensing platforms (e.g., rotational RADAR platforms, rotational LIDAR platforms, directional sensing platforms, etc.), robotic devices, vehicles, industrial systems (e.g., assembly lines, etc.), medical devices (e.g., medical imaging devices, etc.), or mobile communication systems, among other possibilities.

The term "vehicle" is broadly construed herein to cover any moving object, including, for instance, an aerial vehicle, watercraft, spacecraft, a car, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, among other examples.

FIG. 1A illustrates a vehicle 100, according to an example embodiment. In particular, FIG. 1A shows a Right Side View, Front View, Back View, and Top View of the vehicle 100. Although vehicle 100 is illustrated in FIG. 1A as a car, as discussed above, other embodiments are possible. Furthermore, although the example vehicle 100 is shown as a vehicle that may be configured to operate in autonomous mode, the embodiments described herein are also applicable to vehicles that are not configured to operate autonomously. Thus, the example vehicle 100 is not meant to be limiting. As shown, the vehicle 100 includes five sensor units 102, 104, 106, 108, and 110, and four wheels, exemplified by wheel 112.

In some embodiments, each of the sensor units 102-110 may include one or more light detection and ranging devices (LIDARs) that have particular configuration properties to allow scanning an environment around the vehicle 100. Additionally or alternatively, in some embodiments, the sensor units 102-110 may include any combination of sensors, such as global positioning system sensors, inertial measurement units, radio detection and ranging (RADAR) units, cameras, laser rangefinders, LIDARs, and/or acoustic sensors among other possibilities.

As shown, the sensor unit 102 is mounted to a top side of the vehicle 100 opposite to a bottom side of the vehicle 100 where the wheel 112 is mounted. Further, the sensor units 104-110 are each mounted to a given side of the vehicle 100 other than the top side. For example, the sensor unit 104 is positioned at a front side of the vehicle 100, the sensor 106 is positioned at a back side of the vehicle 100, the sensor unit 108 is positioned at a right side of the vehicle 100, and the sensor unit 110 is positioned at a left side of the vehicle 100.

While the sensor units 102-110 are shown to be mounted in particular locations on the vehicle 100, in some embodiments, the sensor units 102-110 may be mounted elsewhere on the vehicle 100, either inside or outside the vehicle 100. For example, although FIG. 1A shows the sensor unit 108 mounted to a rear-view mirror of the vehicle 100, the sensor unit 108 may alternatively be positioned in another location along the right side of the vehicle 100. Further, while five sensor units are shown, in some embodiments more or fewer sensor units may be included in the vehicle 100. However, for the sake of example, the sensor units 102-110 are positioned as shown in FIG. 1A.

In some embodiments, one or more of the sensor units 102-110 may include one or more movable mounts on which the sensors may be movably mounted. The movable mount may include, for example, a rotating platform. Sensors mounted on the rotating platform could be rotated so that the sensors may obtain information from various directions around the vehicle 100. For example, a LIDAR of the sensor unit 102 may have a viewing direction that can be adjusted by actuating the rotating platform to a different direction, etc. Alternatively or additionally, the movable mount may include a tilting platform. Sensors mounted on the tilting platform could be tilted within a given range of angles and/or azimuths so that the sensors may obtain information from a variety of angles. The movable mount may take other forms as well.

Further, in some embodiments, one or more of the sensor units 102-110 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

As shown, the vehicle 100 includes one or more wheels such as the wheel 112 that are configured to rotate to cause the vehicle to travel along a driving surface. In some embodiments, the wheel 112 may include at least one tire coupled to a rim of the wheel 112. To that end, the wheel 112 may include any combination of metal and rubber, or a combination of other materials. The vehicle 100 may include one or more other components in addition to or instead of those shown.

Figure 1B:
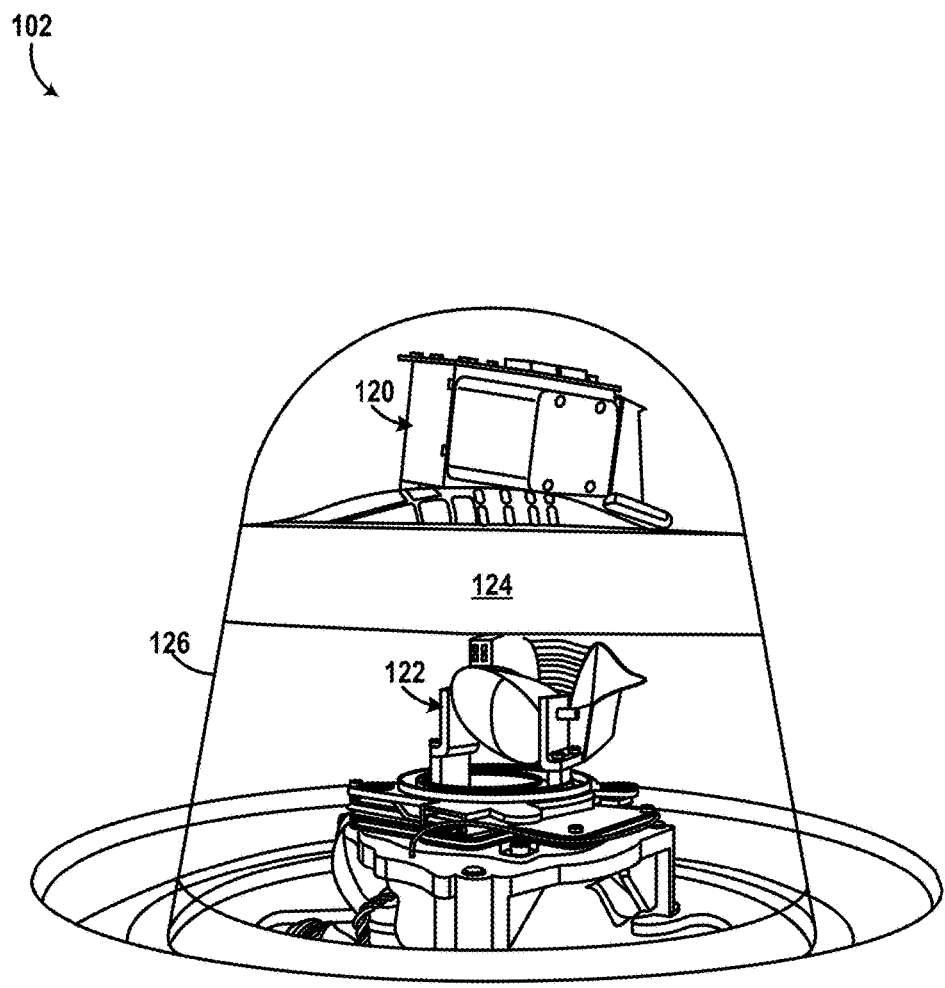
FIG. 1B is a perspective view of a sensor unit positioned at a top side of the vehicle shown in FIG. 1A, according to an example embodiment.

FIG. 1B is a perspective view of the sensor unit 102 positioned at the top side of the vehicle 100 shown in FIG. 1A. As shown, the sensor unit 102 includes a first LIDAR 120, a second LIDAR 122, a dividing structure 124, and light filter 126. As noted above, the sensor unit 102 may additionally or alternatively include other sensors than those shown in FIG. 1B. However, for the sake of example, the sensor unit 102 includes the components shown in FIG. 1B.

In some examples, the first LIDAR 120 may be configured to scan an environment around the vehicle 100 by rotating about an axis (e.g., vertical axis, etc.) while emitting one or more light pulses and detecting reflected light pulses off objects in the environment of the vehicle, for example. In some embodiments, the first LIDAR 120 may be configured to repeatedly rotate about the axis to be able to scan the environment at a sufficiently high refresh rate to quickly detect motion of objects in the environment. For instance, the first LIDAR 120 may have a refresh rate of 10 Hz (e.g., ten complete rotations of the first LIDAR 120 per second), thereby scanning a 360-degree field-of-view (FOV) around the vehicle ten times every second. Through this process, for instance, a 3D map of the surrounding environment may be determined based on data from the first LIDAR 120. In one embodiment, the first LIDAR 120 may include a plurality of light sources that emit 64 laser beams having a wavelength of 905 nm. In this embodiment, the 3D map determined based on the data from the first LIDAR 120 may have a 0.2° (horizontal)×0.3° (vertical) angular resolution, and the first LIDAR 120 may have a 360° (horizontal)×20° (vertical) FOV of the environment. In this embodiment, the 3D map may have sufficient resolution to detect or identify objects within a medium range of 100 meters from the vehicle 100, for example. However, other configurations (e.g., number of light sources, angular resolution, wavelength, range, etc.) are possible as well.

In some embodiments, the second LIDAR 122 may be configured to scan a narrower FOV of the environment around the vehicle 100. For instance, the second LIDAR 122 may be configured to rotate (horizontally) for less than a complete rotation about a similar axis. Further, in some examples, the second LIDAR 122 may have a lower refresh rate than the first LIDAR 120. Through this process, the vehicle 100 may determine a 3D map of the narrower FOV of the environment using the data from the second LIDAR 122. The 3D map in this case may have a higher angular resolution than the corresponding 3D map determined based on the data from the first LIDAR 120, and may thus allow detection/identification of objects that are further than the medium range of distances of the first LIDAR 120, as well as identification of smaller objects within the medium range of distances. In one embodiment, the second LIDAR 122 may have a FOV of 8° (horizontal)×15° (vertical), a refresh rate of 4 Hz, and may emit one narrow beam having a wavelength of 1550 nm. In this embodiment, the 3D map determined based on the data from the second LIDAR 122 may have an angular resolution of 0.1° (horizontal)×0.03° (vertical), thereby allowing detection/identification of objects within a long range of 300 meters to the vehicle 100. However, other configurations (e.g., number of light sources, angular resolution, wavelength, range, etc.) are possible as well.

In some examples, the vehicle 100 may be configured to adjust a viewing direction of the second LIDAR 122. For example, while the second LIDAR 122 has a narrow horizontal FOV (e.g., 8 degrees), the second LIDAR 122 may be mounted to a stepper motor (not shown) that allows adjusting the viewing direction of the second LIDAR 122 to directions other than that shown in FIG. 1B. Thus, in some examples, the second LIDAR 122 may be steerable to scan the narrow FOV along any viewing direction from the vehicle 100.

The structure, operation, and functionality of the first LIDAR 120 and the second LIDAR 122 are described in greater detail within exemplary embodiments herein.

The dividing structure 124 may be formed from any solid material suitable for supporting the first LIDAR 120 and/or optically isolating the first LIDAR 120 from the second LIDAR 122. Example materials may include metals, plastics, foam, among other possibilities.

The light filter 126 may be formed from any material that is substantially transparent to light having wavelengths with a wavelength range, and substantially opaque to light having wavelengths outside the wavelength range. For example, the light filter 126 may allow light having the first wavelength of the first LIDAR 120 (e.g., 905 nm) and the second wavelength of the second LIDAR 122 (e.g., 1550 nm) to propagate through the light filter 126. As shown, the light filter 126 is shaped to enclose the first LIDAR 120 and the second LIDAR 122. Thus, in some examples, the light filter 126 may also be configured to prevent environmental damage to the first LIDAR 120 and the second LIDAR 122, such as accumulation of dust or collision with airborne debris among other possibilities. In some examples, the light filter 126 may be configured to reduce visible light propagating through the light filter 126. In turn, the light filter 126 may improve an aesthetic appearance of the vehicle 100 by enclosing the first LIDAR 120 and the second LIDAR 122, while reducing visibility of the components of the sensor unit 102 from a perspective of an outside observer, for example. In other examples, the light filter 126 may be configured to allow visible light as well as the light from the first LIDAR 120 and the second LIDAR 122.

In some embodiments, portions of the light filter 126 may be configured to allow different wavelength ranges to propagate through the light filter 126. For example, an upper portion of the light filter 126 above the dividing structure 124 may be configured to allow propagation of light within a first wavelength range that includes the first wavelength of the first LIDAR 120. Further, for example, a lower portion of the light filter 126 below the dividing structure 124 may be configured to allow propagation of light within a second wavelength range that includes the second wavelength of the second LIDAR 122. In other embodiments, the wavelength range associated with the light filter 126 may include both the first wavelength of the first LIDAR 120 and the second wavelength of the second LIDAR 122.

In one embodiment, as shown, the light filter 126 has a dome shape and provides a dome-shaped housing for the first LIDAR 120 and the second LIDAR 122. For instance, the dome-shaped housing (e.g., light filter 126) may include the dividing structure 124 that is positioned between the first LIDAR 120 and the second LIDAR 122. Thus, in this embodiment, the first LIDAR 120 may be disposed within the dome-shaped housing. Further, in this embodiment, the second LIDAR 122 may also be disposed within the dome-shaped housing and may be positioned between the first LIDAR 120 and the top side of the vehicle 100 as shown in FIG. 1B.

Figure 1C:
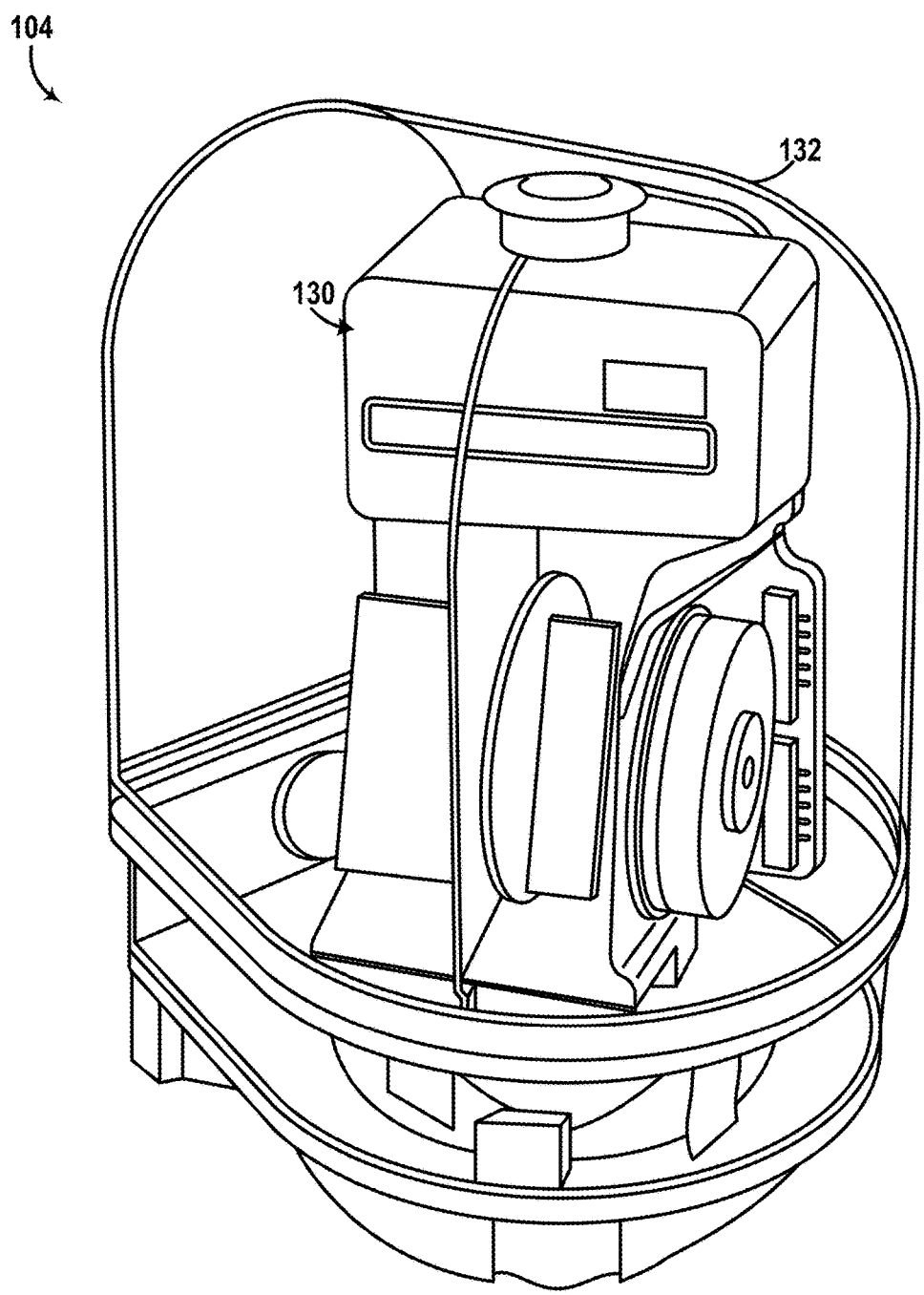
FIG. 1C is a perspective view of a sensor unit positioned at a front side of the vehicle shown in FIG. 1A, according to an example embodiment.

FIG. 1C is a perspective view of the sensor unit 104 positioned at the front side of the vehicle 100 shown in FIG. 1A. In some examples, the sensor units 106, 108, and 110 may be configured similarly to the sensor unit 104 illustrated in FIG. 1C. As shown, the sensor unit 104 includes a third LIDAR 130 and a light filter 132. As noted above, the sensor unit 104 may additionally or alternatively include other sensors than those shown in FIG. 1C. However, for the sake of example, the sensor unit 104 includes the components shown in FIG. 1C.

The third LIDAR 130 may be configured to scan a FOV of the environment around the vehicle 100 that extends away from a given side of the vehicle 100 (i.e., the front side) where the third LIDAR 130 is positioned. Thus, in some examples, the third LIDAR 130 may be configured to rotate (e.g., horizontally) across a wider FOV than the second LIDAR 122 but less than the 360-degree FOV of the first LIDAR 120 due to the positioning of the third LIDAR 130. In one embodiment, the third LIDAR 130 may have a FOV of 270° (horizontal)×110° (vertical), a refresh rate of 4 Hz, and may emit one laser beam having a wavelength of 905 nm. In this embodiment, the 3D map determined based on the data from the third LIDAR 130 may have an angular resolution of 1.2° (horizontal)×0.2° (vertical), thereby allowing detection/identification of objects within a short range of 30 meters to the vehicle 100. However, other configurations (e.g., number of light sources, angular resolution, wavelength, range, etc.) are possible as well. The structure, operation, and functionality of the third LIDAR 130 are described in greater detail within exemplary embodiments of the present disclosure.

The light filter 132 may be similar to the light filter 126 of FIG. 1B. For example, the light filter 132 may be shaped to enclose the third LIDAR 130. Further, for example, the light filter 132 may be configured to allow light within a wavelength range that includes the wavelength of light from the third LIDAR 130 to propagate through the light filter 132. In some examples, the light filter 132 may be configured to reduce visible light propagating through the light filter 132, thereby improving an aesthetic appearance of the vehicle 100.

Figure 1D:
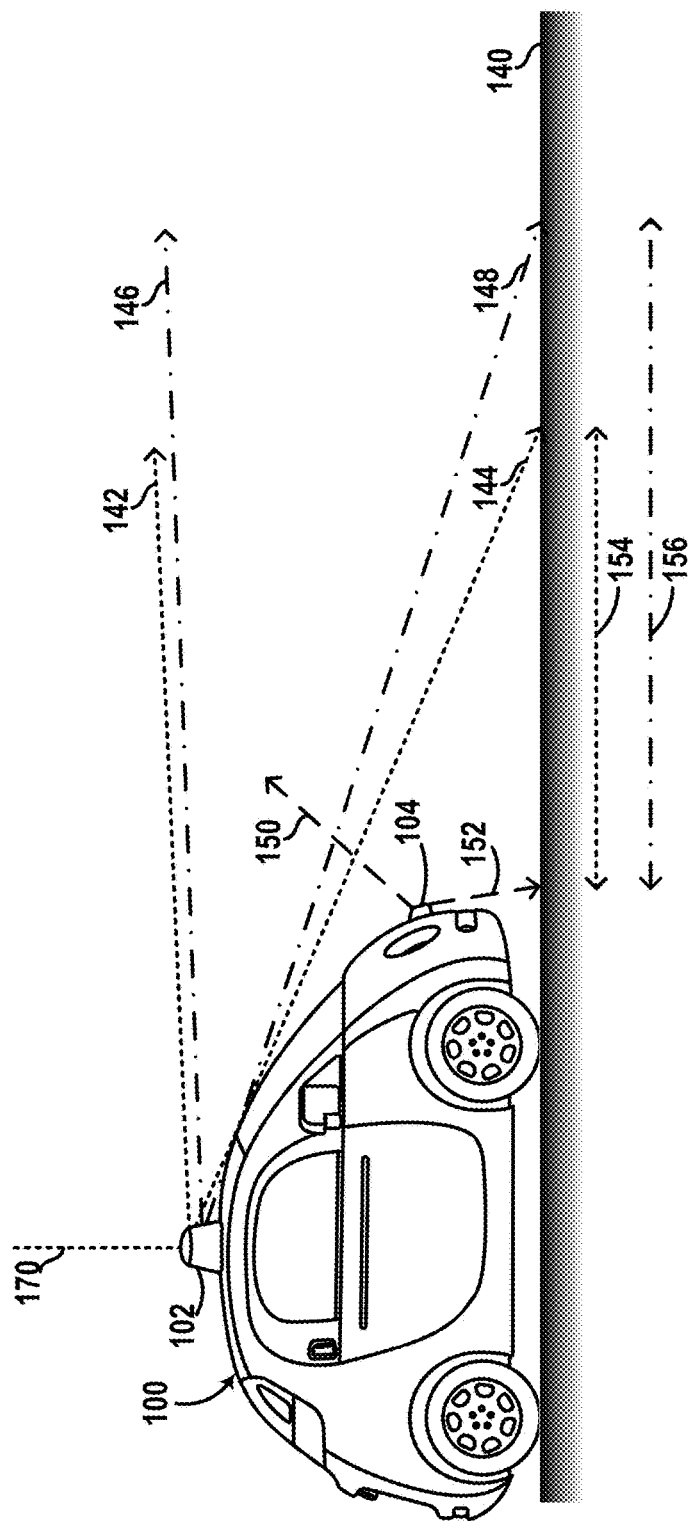
FIG. 1D illustrates in a side view the vehicle shown in FIG. 1A scanning a surrounding environment, according to an example embodiment.
Figure 1E:
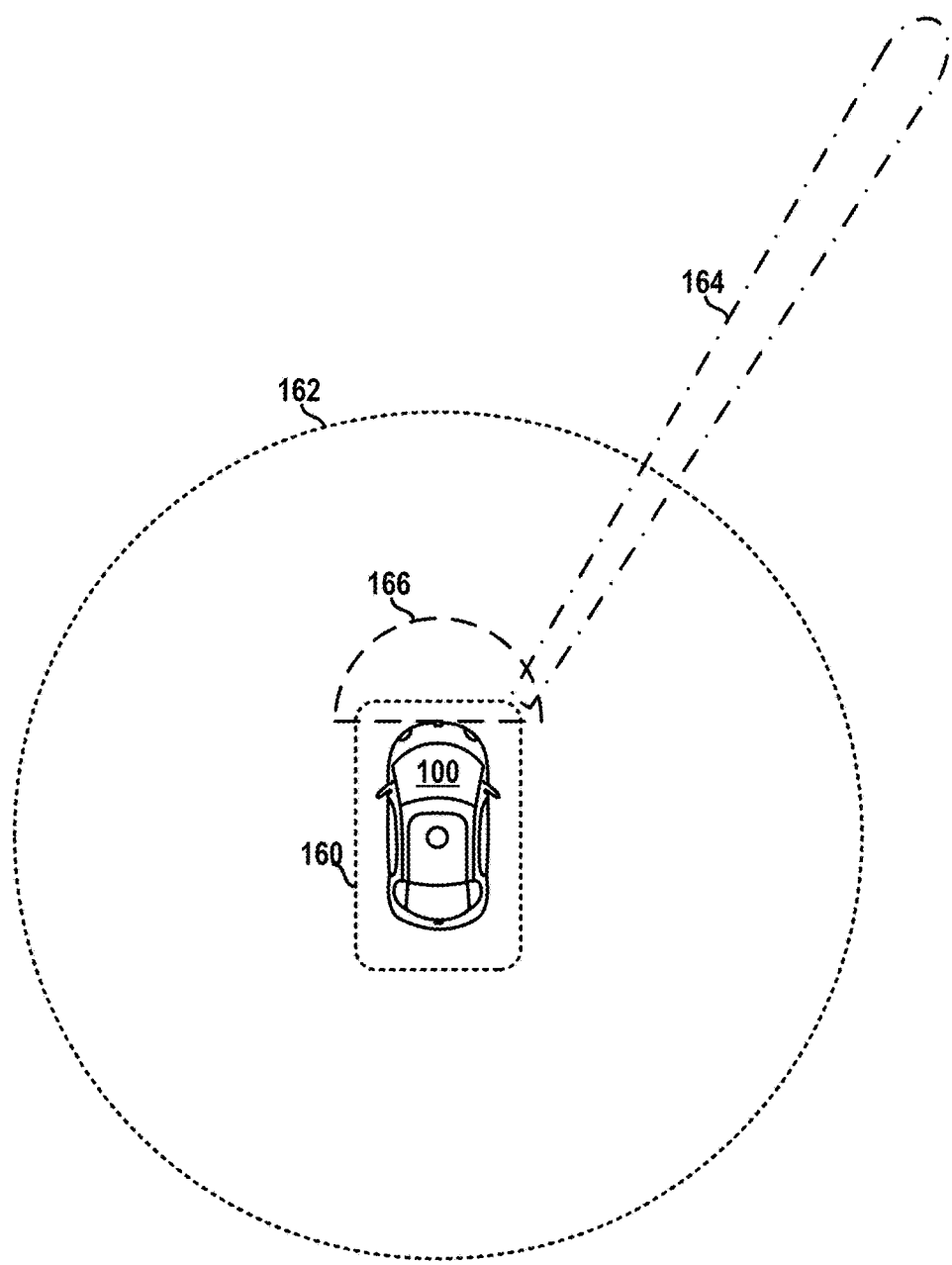
FIG. 1E illustrates in a top view the vehicle shown in FIG. 1A scanning a surrounding environment, according to an example embodiment.

FIGS. 1D and 1E illustrate the vehicle 100 shown in FIG. 1A scanning a surrounding environment, according to an example embodiment.

FIG. 1D illustrates a scenario where the vehicle 100 is operating on a surface 140. The surface 140, for example, may be a driving surface such as a road or a highway, or any other surface. In FIG. 1D, the arrows 142, 144, 146, 148, 150, 152 illustrate light pulses emitted by various LIDARs of the sensor units 102 and 104 at ends of the vertical FOV of the respective LIDAR.

By way of example, arrows 142 and 144 illustrate light pulses emitted by the first LIDAR 120 of FIG. 1B. In this example, the first LIDAR 120 may emit a series of pulses in the region of the environment between the arrows 142 and 144 and may receive reflected light pulses from that region to detect and/or identify objects in that region. Due to the positioning of the first LIDAR 120 (not shown) of the sensor unit 102 at the top side of the vehicle 100, the vertical FOV of the first LIDAR 120 is limited by the structure of the vehicle 100 (e.g., roof, etc.) as illustrated in FIG. 1D. However, the positioning of the first LIDAR 120 in the sensor unit 102 at the top side of the vehicle 100 allows the first LIDAR 120 to scan all directions around the vehicle 100 by rotating about a substantially vertical axis 170. Similarly, for example, the arrows 146 and 148 illustrate light pulses emitted by the second LIDAR 122 of FIG. 1B at the ends of the vertical FOV of the second LIDAR 122. Further, the second LIDAR 122 may also be steerable to adjust a viewing direction of the second LIDAR 122 to any direction around the vehicle 100 in line with the discussion. In one embodiment, the vertical FOV of the first LIDAR 120 (e.g., angle between arrows 142 and 144) is 20° and the vertical FOV of the second LIDAR 122 is 15° (e.g., angle between arrows 146 and 148). However, other vertical FOVs are possible as well depending, for example, on factors such as structure of the vehicle 100 or configuration of the respective LIDARs.

As shown in FIG. 1D, the sensor unit 102 (including the first LIDAR 120 and/or the second LIDAR 122) may scan for objects in the environment of the vehicle 100 in any direction around the vehicle 100 (e.g., by rotating, etc.), but may be less suitable for scanning the environment for objects in close proximity to the vehicle 100. For example, as shown, objects within distance 154 to the vehicle 100 may be undetected or may only be partially detected by the first LIDAR 120 of the sensor unit 102 due to positions of such objects being outside the region between the light pulses illustrated by the arrows 142 and 144. Similarly, objects within distance 156 may also be undetected or may only be partially detected by the second LIDAR 122 of the sensor unit 102.

Accordingly, the third LIDAR 130 (not shown) of the sensor unit 104 may be used for scanning the environment for objects that are close to the vehicle 100. For example, due to the positioning of the sensor unit 104 at the front side of the vehicle 100, the third LIDAR 130 may be suitable for scanning the environment for objects within the distance 154 and/or the distance 156 to the vehicle 100, at least for the portion of the environment extending away from the front side of the vehicle 100. As shown, for example, the arrows 150 and 152 illustrate light pulses emitted by the third LIDAR 130 at ends of the vertical FOV of the third LIDAR 130. Thus, for example, the third LIDAR 130 of the sensor unit 104 may be configured to scan a portion of the environment between the arrows 150 and 152, including objects that are close to the vehicle 100. In one embodiment, the vertical FOV of the third LIDAR 130 is 110° (e.g., angle between arrows 150 and 152). However, other vertical FOVs are possible as well.

It is noted that the angles between the various arrows 142-152 shown in FIG. 1D are not to scale and are for illustrative purposes only. Thus, in some examples, the vertical FOVs of the various LIDARs may vary as well.

FIG. 1E illustrates a top view of the vehicle 100 in a scenario where the vehicle 100 is scanning a surrounding environment. In line with the discussion above, each of the various LIDARs of the vehicle 100 may have a particular resolution according to its respective refresh rate, FOV, or any other factor. In turn, the various LIDARs may be suitable for detection and/or identification of objects within a respective range of distances to the vehicle 100.

As shown in FIG. 1E, contours 160 and 162 illustrate an example range of distances to the vehicle 100 where objects may be detected/identified based on data from the first LIDAR 120 of the sensor unit 102. As illustrated, for example, close objects within the contour 160 may not be properly detected and/or identified due to the positioning of the sensor unit 102 on the top side of the vehicle 100. However, for example, objects outside of contour 160 and within a medium range of distances (e.g., 100 meters, etc.) defined by the contour 162 may be properly detected/identified using the data from the first LIDAR 120. Further, as shown, the horizontal FOV of the first LIDAR 120 may span 360° in all directions around the vehicle 100.

Further, as shown in FIG. 1E, contour 164 illustrates a region of the environment where objects may be detected and/or identified using the higher resolution data from the second LIDAR 122 of the sensor unit 102. As shown, the contour 164 includes objects further away from the vehicle 100 within a long range of distances (e.g., 300 meters, etc.), for example. Although the contour 164 indicates a narrower FOV (horizontally) of the second LIDAR 122, in some examples, the vehicle 100 may be configured to adjust the viewing direction of the second LIDAR 122 to any other direction than that shown in FIG. 1E. By way of example, the vehicle 100 may detect an object using the data from the first LIDAR 120 (e.g., within the contour 162), adjust the viewing direction of the second LIDAR 122 to a FOV that includes the object, and then identify the object using the higher resolution data from the second LIDAR 122. In one embodiment, the horizontal FOV of the second LIDAR 122 may be 8°.

Further, as shown in FIG. 1E, contour 166 illustrates a region of the environment scanned by the third LIDAR 130 of the sensor unit 104. As shown, the region illustrated by the contour 166 includes portions of the environment that may not be scanned by the first LIDAR 120 and/or the second LIDAR 124, for example. Further, for example, the data from the third LIDAR 130 has a resolution sufficient to detect and/or identify objects within a short distance (e.g., 30 meters, etc.) to the vehicle 100.

It is noted that the ranges, resolutions, and FOVs described above are for exemplary purposes only, and may vary according to various configurations of the vehicle 100. Further, the contours 160-166 shown in FIG. 1E are not to scale but are illustrated as shown for convenience of description.

Figure 2:
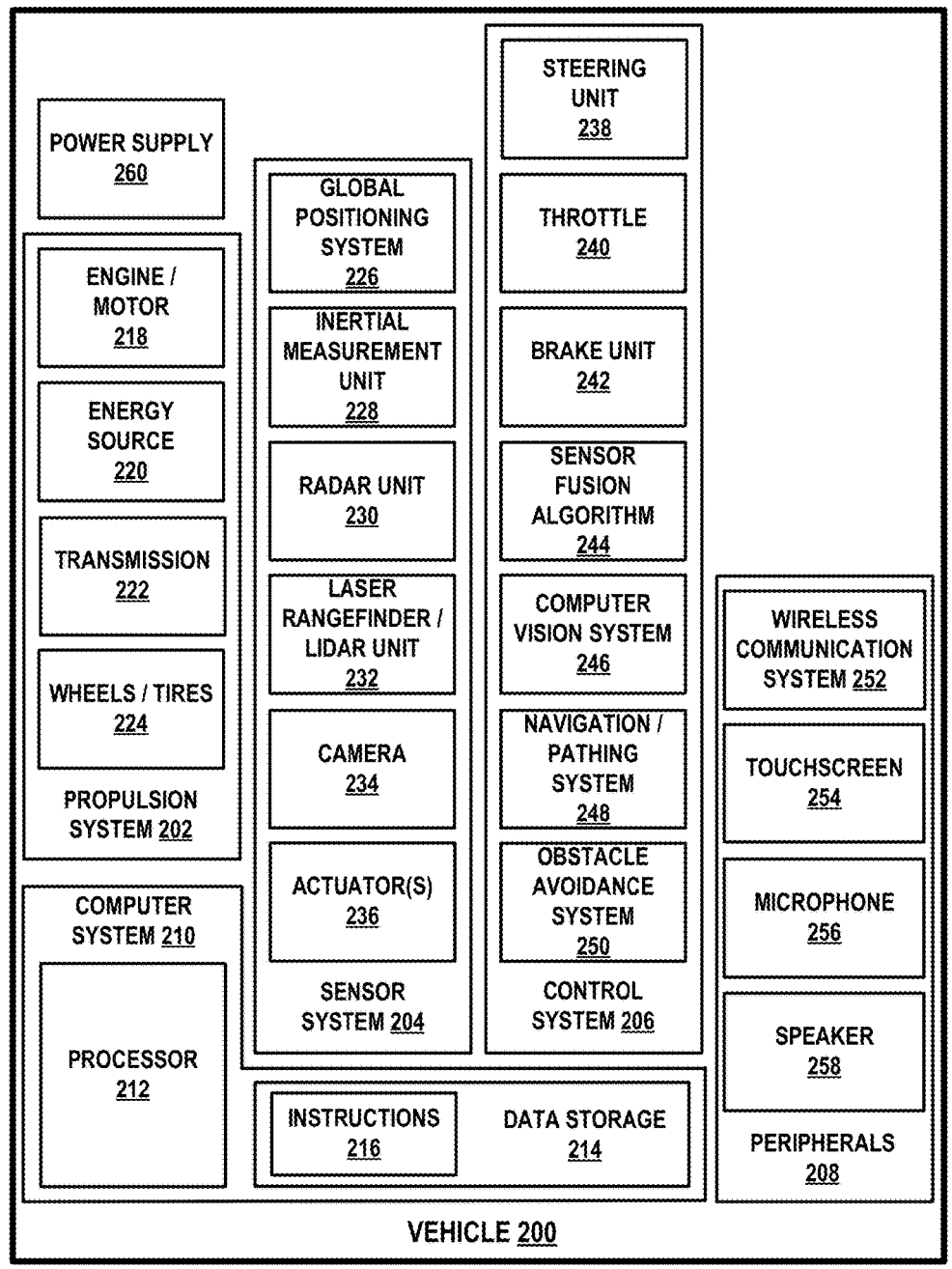
FIG. 2 is a simplified block diagram of a vehicle, according to an example embodiment.

FIG. 2 is a simplified block diagram of a vehicle 200, according to an example embodiment. The vehicle 200 may be similar to the vehicle 100, for example. As shown, the vehicle 200 includes a propulsion system 202, a sensor system 204, a control system 206, peripherals 208, and a computer system 210. In other embodiments, the vehicle 200 may include more, fewer, or different systems, and each system may include more, fewer, or different components. Additionally, the systems and components shown may be combined or divided in any number of ways.

The propulsion system 202 may be configured to provide powered motion for the vehicle 200. As shown, the propulsion system 202 includes an engine/motor 218, an energy source 220, a transmission 222, and wheels/tires 224.

The engine/motor 218 may be or include any combination of an internal combustion engine, an electric motor, a steam engine, and a Stirling engine. Other motors and engines are possible as well. In some embodiments, the propulsion system 202 may include multiple types of engines and/or motors. For instance, a gas-electric hybrid car may include a gasoline engine and an electric motor. Other examples are possible.

The energy source 220 may be a source of energy that powers the engine/motor 218 in full or in part. That is, the engine/motor 218 may be configured to convert the energy source 220 into mechanical energy. Examples of energy sources 220 include gasoline, diesel, propane, other compressed gas-based fuels, ethanol, solar panels, batteries, and other sources of electrical power. The energy source(s) 220 may additionally or alternatively include any combination of fuel tanks, batteries, capacitors, and/or flywheels. In some embodiments, the energy source 220 may provide energy for other systems of the vehicle 200 as well.

The transmission 222 may be configured to transmit mechanical power from the engine/motor 218 to the wheels/tires 224. To this end, the transmission 222 may include a gearbox, clutch, differential, drive shafts, and/or other elements. In embodiments where the transmission 222 includes drive shafts, the drive shafts may include one or more axles that are configured to be coupled to the wheels/tires 224.

The wheels/tires 224 of vehicle 200 may be configured in various formats, including a unicycle, bicycle/motorcycle, tricycle, or car/truck four-wheel format. Other wheel/tire formats are possible as well, such as those including six or more wheels. In any case, the wheels/tires 224 may be configured to rotate differentially with respect to other wheels/tires 224. In some embodiments, the wheels/tires 224 may include at least one wheel that is fixedly attached to the transmission 222 and at least one tire coupled to a rim of the wheel that could make contact with the driving surface. The wheels/tires 224 may include any combination of metal and rubber, or combination of other materials. The propulsion system 202 may additionally or alternatively include components other than those shown.

The sensor system 204 may include a number of sensors configured to sense information about an environment in which the vehicle 200 is located, as well as one or more actuators 236 configured to modify a position and/or orientation of the sensors. As shown, the sensors of the sensor system 204 include a Global Positioning System (GPS) 226, an inertial measurement unit (IMU) 228, a RADAR unit 230, a laser rangefinder and/or LIDAR unit 232, and a camera 234. The sensor system 204 may include additional sensors as well, including, for example, sensors that monitor internal systems of the vehicle 200 (e.g., an $O_2$ monitor, a fuel gauge, an engine oil temperature, etc.). Further, the sensor system 204 may include multiple LIDARs. In some examples, the sensor system 204 may be implemented as multiple sensor units each mounted to the vehicle in a respective position (e.g., top side, bottom side, front side, back side, right side, left side, etc.). Other sensors are possible as well.

The GPS 226 may be any sensor (e.g., location sensor) configured to estimate a geographic location of the vehicle 200. To this end, the GPS 226 may include a transceiver configured to estimate a position of the vehicle 200 with respect to the Earth. The GPS 226 may take other forms as well.

The IMU 228 may be any combination of sensors configured to sense position and orientation changes of the vehicle 200 based on inertial acceleration. In some embodiments, the combination of sensors may include, for example, accelerometers and gyroscopes. Other combinations of sensors are possible as well.

The RADAR unit 230 may be any sensor configured to sense objects in the environment in which the vehicle 200 is located using radio signals. In some embodiments, in addition to sensing the objects, the RADAR unit 230 may additionally be configured to sense the speed and/or heading of the objects.

Similarly, the laser range finder or LIDAR unit 232 may be any sensor configured to sense objects in the environment in which the vehicle 200 is located using lasers. In particular, the laser rangefinder or LIDAR unit 232 may include a laser source and/or laser scanner configured to emit a laser and a detector configured to detect reflections of the laser. The laser rangefinder or LIDAR 232 may be configured to operate in a coherent (e.g., using heterodyne detection) or an incoherent detection mode. In some examples, the LIDAR unit 232 may include multiple LIDARs that each have a unique position and/or configuration suitable for scanning a particular region of an environment around the vehicle 200.

The camera 234 may be any camera (e.g., a still camera, a video camera, etc.) configured to capture images of the environment in which the vehicle 200 is located. To this end, the camera may take any of the forms described above. The sensor system 204 may additionally or alternatively include components other than those shown.

The control system 206 may be configured to control operation of the vehicle 200 and its components. To this end, the control system 206 may include a steering unit 238, a throttle 240, a brake unit 242, a sensor fusion algorithm 244, a computer vision system 246, a navigation or pathing system 248, and an obstacle avoidance system 250.

The steering unit 238 may be any combination of mechanisms configured to adjust the heading of vehicle 200. The throttle 240 may be any combination of mechanisms configured to control the operating speed of the engine/motor 218 and, in turn, the speed of the vehicle 200. The brake unit 242 may be any combination of mechanisms configured to decelerate the vehicle 200. For example, the brake unit 242 may use friction to slow the wheels/tires 224. As another example, the brake unit 242 may convert the kinetic energy of the wheels/tires 224 to electric current. The brake unit 242 may take other forms as well.

The sensor fusion algorithm 244 may be an algorithm (or a computer program product storing an algorithm) configured to accept data from the sensor system 204 as an input. The data may include, for example, data representing information sensed at the sensors of the sensor system 204. The sensor fusion algorithm 244 may include, for example, a Kalman filter, a Bayesian network, an algorithm for some of the functions of the methods herein, or any another algorithm. The sensor fusion algorithm 244 may further be configured to provide various assessments based on the data from the sensor system 204, including, for example, evaluations of individual objects and/or features in the environment in which the vehicle 100 is located, evaluations of particular situations, and/or evaluations of possible impacts based on particular situations. Other assessments are possible as well.

The computer vision system 246 may be any system configured to process and analyze images captured by the camera 234 in order to identify objects and/or features in the environment in which the vehicle 200 is located, including, for example, traffic signals and obstacles. To this end, the computer vision system 246 may use an object recognition algorithm, a Structure from Motion (SFM) algorithm, video tracking, or other computer vision techniques. In some embodiments, the computer vision system 246 may additionally be configured to map the environment, track objects, estimate the speed of objects, etc.

The navigation and pathing system 248 may be any system configured to determine a driving path for the vehicle 200. The navigation and pathing system 248 may additionally be configured to update the driving path dynamically while the vehicle 200 is in operation. In some embodiments, the navigation and pathing system 248 may be configured to incorporate data from the sensor fusion algorithm 244, the GPS 226, the LIDAR unit 232, and one or more predetermined maps so as to determine the driving path for vehicle 200.

The obstacle avoidance system 250 may be any system configured to identify, evaluate, and avoid or otherwise negotiate obstacles in the environment in which the vehicle 200 is located. The control system 206 may additionally or alternatively include components other than those shown.

Peripherals 208 may be configured to allow the vehicle 200 to interact with external sensors, other vehicles, external computing devices, and/or a user. To this end, the peripherals 208 may include, for example, a wireless communication system 252, a touchscreen 254, a microphone 256, and/or a speaker 258.

The wireless communication system 252 may be any system configured to wirelessly couple to one or more other vehicles, sensors, or other entities, either directly or via a communication network. To this end, the wireless communication system 252 may include an antenna and a chipset for communicating with the other vehicles, sensors, servers, or other entities either directly or via a communication network. The chipset or wireless communication system 252 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 252 may take other forms as well.

The touchscreen 254 may be used by a user to input commands to the vehicle 200. To this end, the touchscreen 254 may be configured to sense at least one of a position and a movement of a user's finger via capacitive sensing, resistance sensing, or a surface acoustic wave process, among other possibilities. The touchscreen 254 may be capable of sensing finger movement in a direction parallel or planar to the touchscreen surface, in a direction normal to the touchscreen surface, or both, and may also be capable of sensing a level of pressure applied to the touchscreen surface. The touchscreen 254 may be formed of one or more translucent or transparent insulating layers and one or more translucent or transparent conducting layers. The touchscreen 254 may take other forms as well.

The microphone 256 may be configured to receive audio (e.g., a voice command or other audio input) from a user of the vehicle 200. Similarly, the speakers 258 may be configured to output audio to the user of the vehicle 200. The peripherals 208 may additionally or alternatively include components other than those shown.

The computer system 210 may be configured to transmit data to, receive data from, interact with, and/or control one or more of the propulsion system 202, the sensor system 204, the control system 206, and the peripherals 208. To this end, the computer system 210 may be communicatively linked to one or more of the propulsion system 202, the sensor system 204, the control system 206, and the peripherals 208 by a system bus, network, and/or other connection mechanism (not shown).

In one example, the computer system 210 may be configured to control operation of the transmission 222 to improve fuel efficiency. As another example, the computer system 210 may be configured to cause the camera 234 to capture images of the environment. As yet another example, the computer system 210 may be configured to store and execute instructions corresponding to the sensor fusion algorithm 244. As still another example, the computer system 210 may be configured to store and execute instructions for determining a 3D representation of the environment around the vehicle 200 using the LIDAR unit 232. Other examples are possible as well.

As shown, the computer system 210 includes the processor 212 and data storage 214. The processor 212 may comprise one or more general-purpose processors and/or one or more special-purpose processors. To the extent the processor 212 includes more than one processor, such processors could work separately or in combination. Data storage 214, in turn, may comprise one or more volatile and/or one or more non-volatile storage components, such as optical, magnetic, and/or organic storage, and data storage 214 may be integrated in whole or in part with the processor 212.

In some embodiments, data storage 214 may contain instructions 216 (e.g., program logic) executable by the processor 212 to execute various vehicle functions (e.g., methods 500-700, etc.). Data storage 214 may contain additional instructions as well, including instructions to transmit data to, receive data from, interact with, and/or control one or more of the propulsion system 202, the sensor system 204, the control system 206, and/or the peripherals 208. The computer system 210 may additionally or alternatively include components other than those shown.

As shown, the vehicle 200 further includes a power supply 260, which may be configured to provide power to some or all of the components of the vehicle 200. To this end, the power supply 260 may include, for example, a rechargeable lithium-ion or lead-acid battery. In some embodiments, one or more banks of batteries could be configured to provide electrical power. Other power supply materials and configurations are possible as well. In some embodiments, the power supply 260 and energy source 220 may be implemented together as one component, as in some all-electric cars.

In some embodiments, the vehicle 200 may include one or more elements in addition to or instead of those shown. For example, the vehicle 200 may include one or more additional interfaces and/or power supplies. Other additional components are possible as well. In such embodiments, data storage 214 may further include instructions executable by the processor 212 to control and/or communicate with the additional components.

Still further, while each of the components and systems are shown to be integrated in the vehicle 200, in some embodiments, one or more components or systems may be removably mounted on or otherwise connected (mechanically or electrically) to the vehicle 200 using wired or wireless connections. The vehicle 200 may take other forms as well.

In some embodiments, as noted above, the vehicle 200 may rotate one or more components, such as one or more of the sensors in the sensor system 204 and/or one or more of the peripherals 208, among other possibilities. Referring back to FIG. 1E by way of example, the vehicle 100 scans portions of the environment illustrated by contours 162-166 by rotating respective sensors of the sensor units 102-110. Similarly, the vehicle 200 in some embodiments may mount one or more of its various components on respective rotating platforms to adjust directions of the various components.

Figure 3:
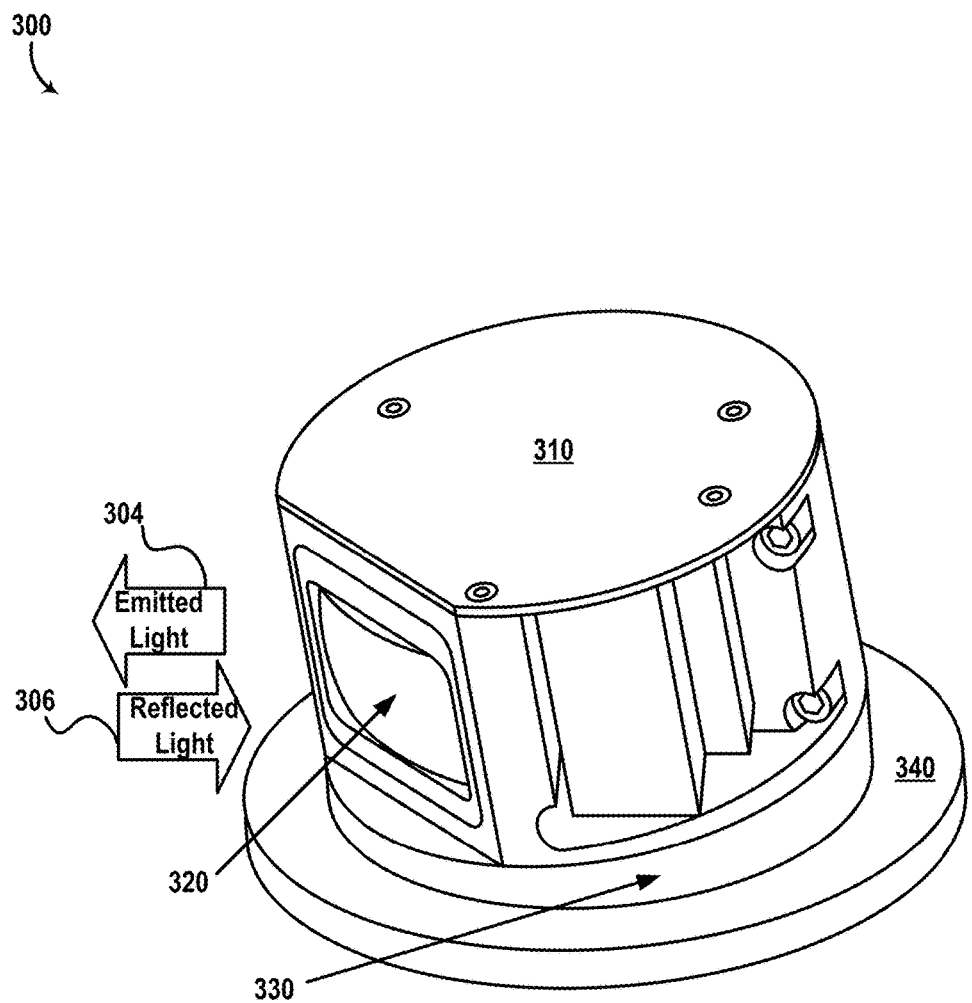
FIG. 3 illustrates a LIDAR device, according to an example embodiment.

For example, FIG. 3 illustrates a LIDAR device 300, according to an example embodiment. In some examples, the LIDAR 300 may be similar to the LIDARs 120-122 of FIG. 1B, the LIDAR 130 of FIG. 1C, the LIDAR(s) of the LIDAR unit 232, and/or any other LIDAR device mounted to a vehicle such as the vehicles 100, 200. As shown, the LIDAR device 300 includes a housing 310 and a lens 320. Additionally, light beams 304 emitted by the LIDAR device 300 propagate from the lens 320 along a viewing direction of the LIDAR 300 toward an environment of the LIDAR device 300, and may reflect off one or more objects in the environment as reflected light 306.

The housing 310 included in the LIDAR device 310 can house the various components included in the LIDAR device 300. The housing 310 can be formed from any material capable of supporting the various components of the LIDAR device 300 included in an interior space of the housing 310. For example, the housing 310 may be formed from a solid material such as plastic or metal among other possibilities.

In some examples, the housing 310 can be configured to have a substantially cylindrical shape and to rotate about an axis of the LIDAR device 300. For example, the housing 310 can have the substantially cylindrical shape with a diameter of approximately 10 centimeters. In some examples, the axis is substantially vertical. By rotating the housing 210 that includes the various components, in some examples, a three-dimensional map of a 360-degree view of the environment of the LIDAR device 300 can be determined without frequent recalibration of the arrangement of the various components of the LIDAR device 300. Additionally or alternatively, in some examples, the LIDAR device 300 can be configured to rotate less than a complete rotation to allow scanning a portion of the environment that is less than a 360-degree view (e.g., contours 164, 166 of FIG. 1E). Additionally or alternatively, in some examples, the LIDAR device 300 can be configured to tilt the axis of rotation of the housing 310 to control the field of view of the LIDAR device 300.

The lens 320 mounted to the housing 310 can have an optical power to both collimate the emitted light beams 304, and/or focus the reflected light 306 from one or more objects in the environment of the LIDAR device 300 onto detectors in the LIDAR device 300. In one example, the lens 320 has a focal length of approximately 120 mm. In some examples, where the same lens 320 is used to perform both collimation and receiving of light 304-306, instead of a transmit lens for collimating and a receive lens for focusing, advantages with respect to size, cost, and/or complexity can be provided.

The LIDAR device 300 also includes a rotor platform 330 and a stator platform 340. Various rotating components of the LIDAR device 300, such as the lens 320 and other components inside the housing 310, can be mounted on that rotor platform 330 that rotates relative to the stator platform 340 to provide a 360-degree view (or less) of the environment surrounding the LIDAR device 300. In one example, the stator platform 340 can be coupled to a side of a vehicle, similarly to the sensor units 102-110 of vehicle 100, and the rotor platform 330 may rotate relative to the stator platform 340 to adjust the directions of the emitted light 304 to scan various portions of an environment around the vehicle (e.g., the portions of the environment illustrated by contours 162-164 of FIG. 1E, etc.).

III. ILLUSTRATIVE ROTARY JOINT CONFIGURATIONS

Within examples, a rotary joint may be configured as a communication interface between two structures of an electromechanical system, in which one or both of the two structures is configured to rotate relative to the other structure. To that end, in some example implementations herein, a portion of the rotary joint may be coupled to one structure of the example system and another portion may be coupled to the other structure of the example system. For instance, referring back to FIG. 3, an example rotary joint may be configured as an interface between the rotor platform 330 and the stator platform 340 such that a portion of the rotary joint is included in the rotor platform 330 and another portion of the rotary joint is included in the stator platform 340. Additionally or alternatively, in some example implementations, the rotary joint may be included within a structure arranged between two structures that rotate with respect to one another. For instance, in an example system that includes a robotic joint that couples two robotic links, the rotary joint may be disposed within the robotic joint to facilitate signal communication between the two robotic links. Other example implementations are possible as well in line with the discussion above.

Figure 4:
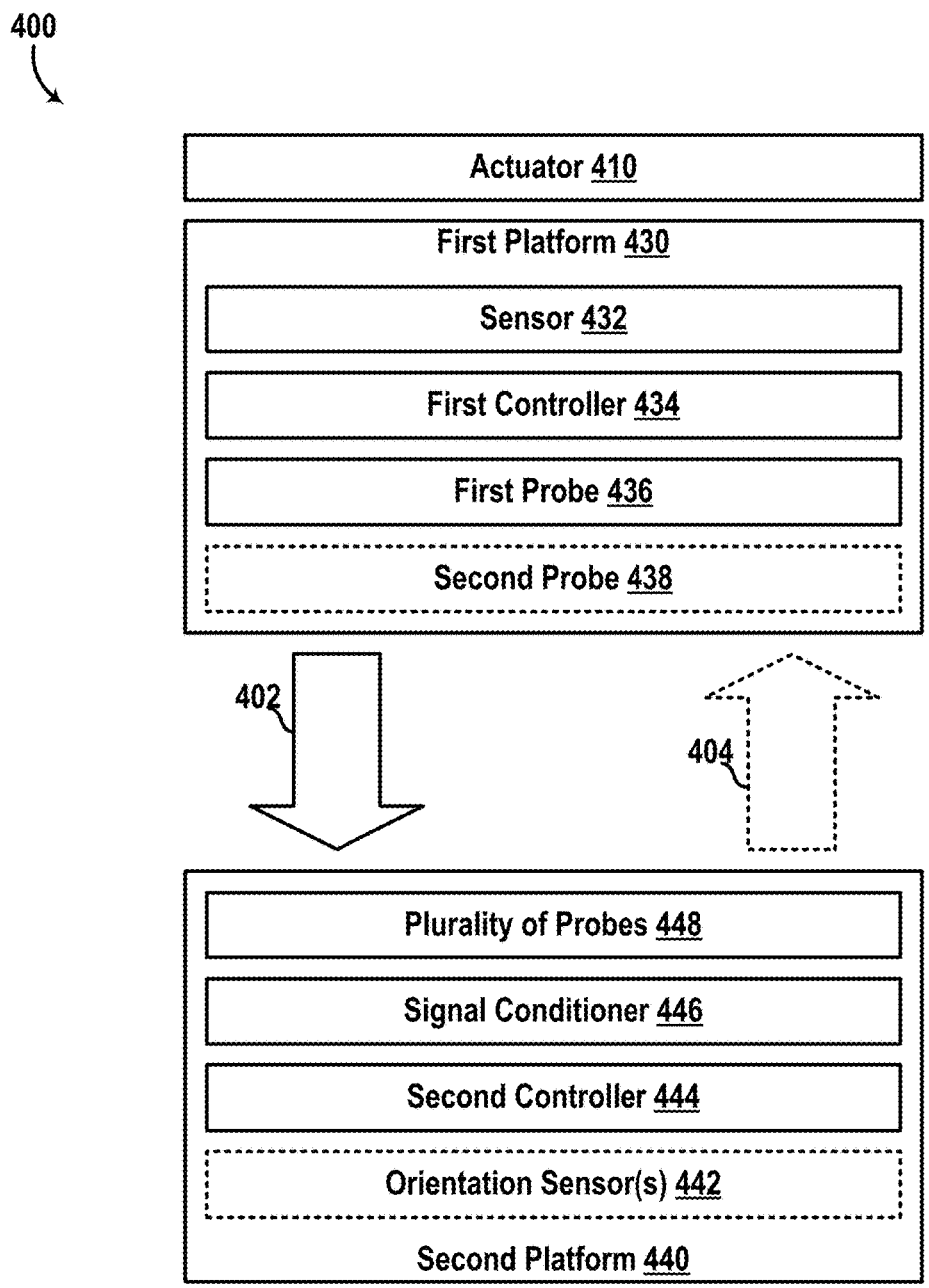
FIG. 4 is a simplified block diagram of a device that includes a rotary joint, according to an example embodiment.

FIG. 4 is a simplified block diagram of a device 400 that includes a rotary joint, according to an example embodiment. In some examples, the device 400 can be used with an electromechanical system, such as any of the vehicles 100 and 200, or any other electromechanical system in line with the discussion above. In some examples, the device 400 may be similar to the LIDAR devices 120, 122, 130, 300, and/or any of the components of the vehicles 100-200 that include a moveable component. As shown, the device 400 includes an actuator 410, a first platform 430, and a second platform 440.

The actuator 410 may be similar to the actuator(s) 236 of the vehicle 200. In some examples, the actuator 410 may be configured to cause a relative rotation between the first platform 430 (or one or more components thereof) and the second platform 440 (or one or more components thereof). To that end, for example, the actuator 410 may be coupled to one or both of the platforms 430, 440 (or one or more components thereof) to cause the relative rotation.

The first platform 430 may be similar to the rotor platform 330 and/or the stator platform 340 of the device 300. As shown, the first platform 430 includes a sensor 432, a first controller 434, a first probe 436. In some examples, the first platform 430 may also include a second probe 438. Thus, in one example, similarly to the rotor platform 330 of the device 300, the first platform 430 could be rotated (e.g., by the actuator 410, etc.) about an axis to adjust a viewing direction of the sensor 432.

The sensor 432 may include any sensor, such as one or more sensors of the sensor system 204 of the vehicle 200, one or more of the sensors included in the vehicle 100, and/or the sensor(s) included in the device 300, among other possibilities.

The first controller 434 may be coupled to various components of the first platform 430 and configured to operate one or more of the various components. The first controller 434 may include any combination of general-purpose processors, specific-purpose processors, data storage, logic circuitry, and/or any other circuitry configured to operate one or more components of the device 400. For instance, similarly to the computer system 210 of the vehicle 200, the first controller 434 may include one or more processors that execute instructions stored in a data storage (e.g., similar to data storage 214) to operate the sensor 432 and/or the first probe 436 in line with the discussion above. In one example, the first controller 434 may be configured to receive data from the sensor 432 and to provide a modulated electrical signal indicative of the data to the first probe 436. For instance, the data may be indicative of a scan of an environment of the device 400 by the sensor 432, a representation of sounds detected by the sensor 432, and/or any other sensor output of the sensor 432.

The first probe 436 may include an antenna, a transmitter, a receiver, a transceiver, and/or any other circuitry configured to modulate and/or emit wireless signals 402 toward the second platform 440. In some examples, the first probe 436 may also be configured to receive wireless signals 404 propagating from the second platform 440, and to provide a probe signal to the first controller 434 indicative of the received wireless signal 404. In one example, the wireless signal 404 received by the first probe 436 may be indicative of instructions for operating the sensor 432 and/or any other component of the device 400 (e.g., actuator 410, etc.). In one embodiment, the wireless signals 402 and 404 could be radio-frequency (RF) signals having frequencies in the EHF band or higher (e.g., greater than 3 GHz). In other embodiments, the wireless signals 402 and 404 may have any other RF frequency or other frequency (e.g., infrared frequency, etc.).

In line with the discussion above, the first platform 430 may also include a first side (not shown) adjacent to the second platform 440 (or components thereof). The wireless signal 402 may be associated with the RF waves (e.g., emitted by the first probe 436, etc.) propagating toward the second platform 440. Further, in some examples, the first platform 430 could also include second probe 438 that is similar to first probe 436. For example, the second probe 438 could be positioned at least a threshold distance away from the first probe 436, and could be configured to communicate with one probe on the second platform 440, while the first probe 436 is simultaneously communicating with another probe on the second platform 440. Thus, in this example, the present disclosure may allow multiple wireless links simultaneously between the two platforms 430 and 440, thereby providing an additional improvement over traditional rotary joints that can only establish one wireless link between the rotor and the stator.

The second platform 440 may be similar to the rotor platform 330 and/or the stator platform 340 of the device 300. As shown, the second platform 440 includes a second controller 444, a signal conditioner 446, and a plurality of probes 448. In some examples, the second platform 440 may also include one or more orientation sensors 442. The orientation sensors 442 may include any orientation sensors such as encoders, range sensors, etc., among other possibilities. In some examples, similarly to the stator platform 340 of the device 300, the second platform 440 may be positioned adjacent to the first platform 430. Thus, in this example, one or more of the probes 448 could be used for wireless communication with one or more of the probes 436, 438 of the first platform 430.

The second controller 444 may include any combination of processors, logic circuitry, etc., similarly to the first controller 434. Like the first controller 434, the second controller 444 may be coupled to the second probe 446 and configured to receive a probe signal from one or more of the probes 448 indicative of wireless signals 402 received by the second probe(s) 448. In one example, the second controller 444 may be configured to demodulate the probe signal from the probes 448, and to determine the data from the sensor 432 based on the demodulated signal.

Like the first probe 436, each of the probes 448 may include an antenna, a transmitter, a receiver, a transceiver, and/or any other circuitry. The probe 448 may be configured to receive wireless signals 402 propagating from the first platform 430, and to provide a probe signal to the second controller 444 indicative of the received wireless signals 402. For example, the wireless signal 402 received by the probe(s) 448 may be indicative of data from the sensor 432. Additionally or alternatively, in some examples, the probe 448 may also be configured to modulate and/or emit wireless signals 404 for propagation inside toward the first platform 430. For example, the signals 404 emitted by the probe 448 may be indicative of instructions for operating the sensor 432 and/or any other component of the device 400 (e.g., actuator 410, etc.).

In line with the discussion above, signal conditioner 446 may include any combination of analog circuitry, digital circuitry, processors, etc., configured to select one of the probes 448 for wireless communication with the probes 436 and/or 438 of the first platform. In one example, the probes 448 could be arranged in a substantially circular arrangement along the side of the platform 440 facing the platform 430. In this example, as two platforms are rotated relative to one another (e.g., by actuator 410), the signal conditioner 446 may select or switch between probes 448 to use the probe having the best air interface conditions for communicating with the probe 436 and/or 438. For example, the selected probe of probes 438 could be the probe that is closest to the probe 436 and/or the probe having the most aligned polarization with probe 436. Thus, as the first platform 430 (or the second platform 440) rotates, the device 400 may continue having a strong wireless communication interface between the moving parts, and thus a high data throughput can be achieved for communicating data from the sensor 432 to the controller 444 of the second platform 440, and for communicating operation instructions from the second platform 440 to one or more components of the first platform 430 and beyond.

As noted above, one side of the second platform 440 may be positioned at a predetermined distance to an adjacent side of the first platform 430. As a result, for example, one or more of the probes 448 may communicate with the probe 436 (and/or 438) via a wireless communication path that includes the wireless signals 402 and/or 404.

In some embodiments, the device 400 may include one or more elements in addition to or instead of those shown. For example, the first platform 430 may include one or more additional components such as a speaker, a display, or any other component (e.g., peripherals 208 of the vehicle 200). Other additional or alternative components are possible as well. In such embodiments, the controllers 434 and 444 may also be configured to operate such components and/or to facilitate communication between such components and other components of the device 400 (and beyond) via the probes 436, 438, and 448.

Still further, while each of the components and systems are shown to be integrated in the device 400, in some embodiments, one or more components may be removably mounted on or otherwise connected (mechanically or electrically) to the device 400 using wired or wireless connections. For example, the first probe 436 may be alternatively positioned outside the first platform 430 (e.g., mechanically disposed at the bottom of rotor platform 330 of FIG. 3, etc.), or the platforms 430 and 440 may be alternatively arranged in any different arrangement that maintains the predetermined distance between the platforms 430 and 440. The device 400 may take other forms as well. Further, in some embodiments, some of the components shown in FIG. 4 could be combined. For example, signal conditioner 446 could be implemented as program instructions executable by the controller 444 to perform the functions described above. Thus, in this example the signal conditioner 446 and the controller 444 could be combined into one component. Other examples are possible as well.

Figure 5A:
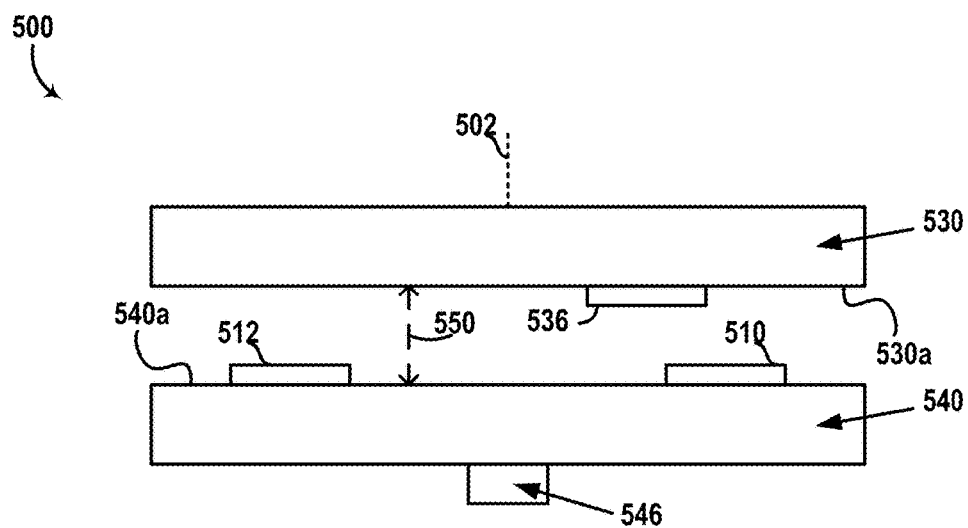
FIG. 5A illustrates a side view of a device, according to an example embodiment.

FIG. 5A illustrates a side-view of a device 500, according to an example embodiment. The device 500 may be similar to the devices 120, 122, 130, 300, and/or 400, and may be used with an electromechanical system such as the vehicles 100, 200, among other possibilities. As shown, device 500 includes platforms 530 and 540 that are similar, respectively to platforms 430 and 440 of FIG. 4. Further, similarly to the device 400, device 500 includes probe 536 that is similar to probe 436, and probes 510 and 512 that are similar to probes 408. Further, device 500 includes a signal conditioner 546 that is similar to conditioner 446 of FIG. 4. Although not shown in FIG. 5, in some examples, the device 500 may include additional components such as one or more of the components of the device 400 (e.g., controllers, sensors, actuators, etc.).

In line with the discussion above, the device 500 may provide a communication interface for a moveable component of an electromechanical system. For example, referring back to FIG. 3, the first platform 530 may be similar to rotor platform 330. Further, in this example, the second platform 540 may be similar to stator platform 340. However, other arrangements and implementations of the device 500 are possible as well in accordance with the present disclosure.

In the example shown in FIG. 5A, a first side 530a of the first platform 530 is positioned within a predetermined distance to a second side 540a of the second platform 540. Further, in some examples, the platforms 530 and/or 540 could be rotated with respect to one another (e.g., by an actuator) such that the first side 530a and the second side 540a remain within the predetermined distance 550 to one another. For example, the first platform 530 could be rotated about a shared (e.g., central) axis 502, thereby maintaining the predetermined distance 550 to the second platform 540. The distance 550 could be any distance suitable for communication between the probe 536 mounted on the platform 530 and one of the probes 510, 512 mounted on the platform 540. In one embodiment, the radio frequency used by the probes 510, 512, and 536 is the range of 20-140 GHz, and the predetermined distance 550 is in the range of 5 millimeters to 10 millimeters. However, other frequencies and distances are possible as well.

In line with the discussion above, signal conditioner 546 may be configured to select one of probes 510 or 512 on platform 540 for wireless communication with probe 536 of platform 530 based on the orientation of platform 530 relative to platform 540. For example, as shown in FIG. 5A, signal conditioner 546 may select probe 512 for wireless communication with probe 536, as probe 536 is shown to be closer to probe 512 than probe 510. Further, as one or both of the platforms rotate, the conditioner 546 may select a different probe on platform 540 to wirelessly communicate with probe 536 of platform 530. Although not shown, in some examples, signal conditioner 546 may be electrically coupled to probes 510 and 512 using wired or wireless connections. In one example, signal conditioner 546 could be connected to probes 510, 512 via conducting paths inside second platform 540. Other examples are possible as well.

Figure 5B:
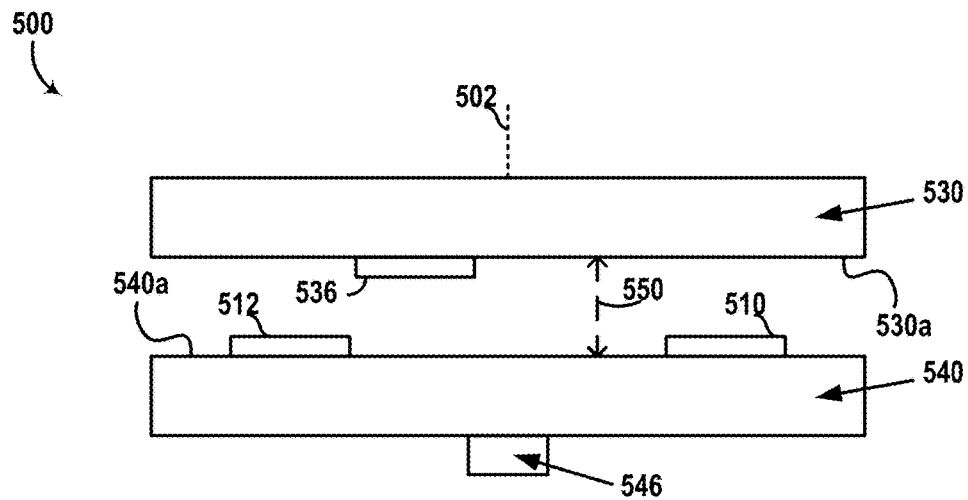
FIG. 5B illustrates another side view of the device of FIG. 5A, according to an example embodiment.

FIG. 5B illustrates another side view of the device 500. The side view shown in FIG. 5B may illustrate a scenario where the first platform 530 is rotated about axis 502 in a clockwise direction from the orientation shown in FIG. 5A. Thus, in this scenario, probe 536 of platform 530 is shown to be closer to probe 510 than probe 512 of platform 540. In line with the discussion above, the signal conditioner 546 could be configured to detect such change and responsively switch to or select probe 510 (instead of probe 512) for communication with the probe 536.

Figure 5C:
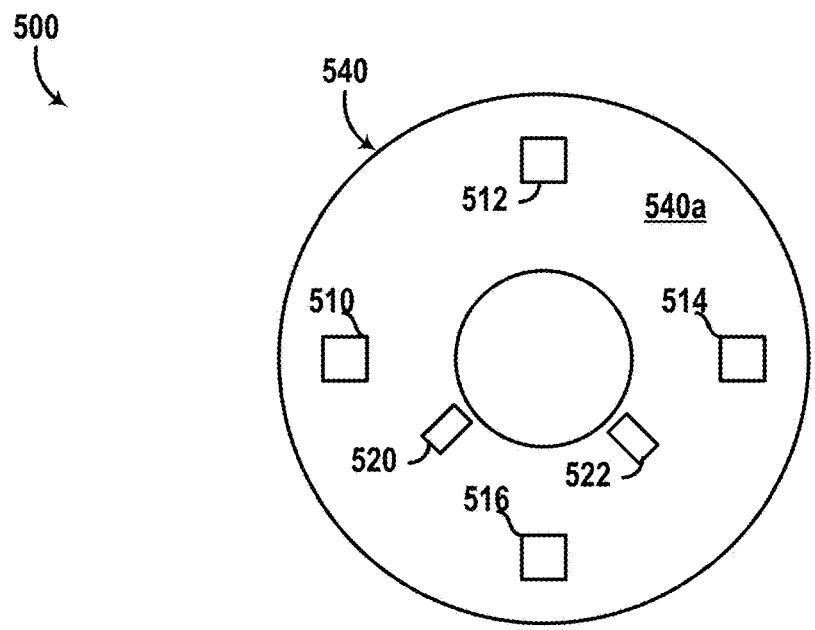
FIG. 5C illustrates a cross section view of the device of FIG. 5A, according to an example embodiment.

FIG. 5C illustrates a cross section view of the device 500. In the cross section view shown in FIG. 5C, the side 540a of the platform 540 is pointing out of the page. Similarly to FIGS. 5A and 5B, the device 500 in FIG. 5C shows probes 510 and 512 mounted to the side 540a of the device 500. Further, as shown, probes 514 and 516 are also mounted to the side 540a of the platform 540. Thus, the plurality of probes 510, 512, 514, and 516 are shown as 4 probes arranged in a substantially circular arrangement in line with the discussion above. Thus, referring back to FIGS. 5A and 5B by way of example, as the platform 530 rotates about axis 502, the probe 536 may align with one of the probes 510, 512, 514 or 516. However, in some examples, the platform 540 could mount more or fewer probes than those shown.

As noted above, in some examples, the signal conditioner could select which probe to use for wireless communication between the two platforms based on signal strength measurements between the probe on platform 530 and the plurality of probes on the platform 540. However, in other examples, the present method provides for determining an indication of the orientation between the platforms 530 and 540 based on one or more orientation sensors. For instance, in the example shown in FIG. 5C, sensors 520 and 522 could be mounted on the side 540a.

The sensors 520 and 522 may include any sensors suitable for measuring or estimating the orientation of the platform 530 and/or 540. Thus the sensors 520 and 522 may include any orientation sensor, such as encoder disks, photodetectors, magnetic sensors, range sensors, among other possibilities. Further, in some examples, the positions, shapes and configurations of the sensors 520 and 522 may vary as well.

Figure 5D:
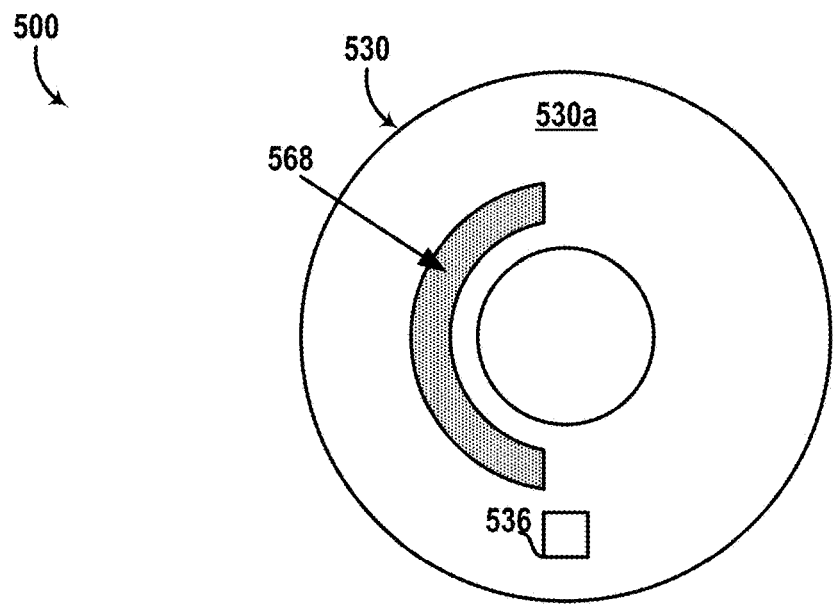
FIG. 5D illustrates another cross section view of the device of FIG. 5A, according to an example embodiment.

FIG. 5D shows another cross section view of the device 500. The cross section view of FIG. 5D shows side 530a of platform 530 pointing out of the page. As shown, the side 530a includes a detection region 568. For example, the detection region 568 could have different material characteristics (e.g., transparency/opaqueness, magnetic properties, color, shape, holes, etc.) than other regions of the side 530a, and the region 568 may be detectable by the sensors 520, 522. For example, as the platform 530 rotates relative to the platform 540 (e.g., about axis 502 shown in FIG. 5A), a different combination of the sensors 520 and 522 may overlap with the detection region 568. And the signal conditioner could select which of the probes 510, 512, 514, 516 should be used to communicate with the probe 536 accordingly. Table 1 illustrates example combinations of outputs from sensors 520 and 522 as the platform 530 rotates relative to platform 540 along the clockwise direction about the axis 502 of FIG. 5A, mapped to example probe selections.

TABLE 1

| Sensor 520 | Sensor 522 | Selected Probe |
|---|---|---|
| 1 | 1 | Probe 510 |
| 1 | 0 | Probe 512 |
| 0 | 0 | Probe 514 |
| 0 | 1 | Probe 516 |

In Table 1, a value of "1" may indicate detection of the region 568 by a sensor and a value of "0" may indicate that the region 568 was not detected by the sensor, for example.

As noted above, in some examples, the signal conditioner 546 could be implemented using analog circuitry, such as a multiplexer circuit and the like. In one example, where one or more multiplexers are used to implement the signal conditioner 546, the selector inputs of the multiplexers could be coupled or connected to sensors 520 and 522, and the channel line inputs of the multiplexers could be connected to each of the probes 512-516. In this example, an output of the multiplexer circuit may connect with the channel line associated with the selected probe in accordance to the mapping of Table 1.

In another example, the signal conditioner 546 could be implemented using program instructions stored in a data storage (e.g., instructions 216 in data storage 214 of FIG. 2), that when executed by one or more processors of a computing device (e.g., processor 212 of computer system 210), may cause the computing device to perform the functions described above for the multiplexer circuit. For example, the computing device could also store a mapping such as that shown in Table 1, and could then use the mapping and the outputs of the sensors 520 and 522 to select a probe in line with the discussion above.

Thus, in some examples, signal conditioner 546 can dynamically change which of the probes 510-516 the device 500 will use to communicate with probe 536 of the first platform 530 as the relative orientation between the two platforms 530 and 540 changes. For instance, signal conditioner 546 may be configured to transition between two probes in a substantially seamless manner (e.g., by using high-speed multiplexer circuitry, etc.), and thus a controller coupled to signal conditioner 546 could maintain a substantially continuous high data rate communication interface with another controller coupled to the probe 536, even as the signal conditioner dynamically switches between the different probes 510-516.

Additionally or alternatively, in some examples, signal conditioner 546 may be configured to select which probe to use for communicating with probe 536 of the first platform 530 based also on a direction of rotation of the first platform 530 relative to the second platform 540. By way of example, in the arrangement of FIGS. 5A-5D, if the probe 510 is currently selected and the signal conditioner determines that the first platform 530 is rotating in a clockwise direction, then the signal conditioner 546 may select the probe 512 when probe 536 is positioned at a substantially same distance to both probes 510 and 512. Whereas, for example, if the platform 530 is rotating in the anti-clockwise direction, the signal conditioner 546 may select probe 516 when probe 536 is positioned at a substantially same distance to both probes 510 and 516. Thus, in some examples, selecting which probe to use for communication with the first platform could also be based on the direction of rotation of the first platform 530 relative to the second platform 540. Other examples are possible as well in line with the discussion above.

It is noted that the shapes, dimensions, and positions shown in FIGS. 5A-5D for the device 500 and the various components of the device 500 are for illustrative purposes only. The device 500 may take other forms, shapes, and/or dimensions as well.

IV. ILLUSTRATIVE METHODS AND COMPUTER-READABLE MEDIA

Figure 6:
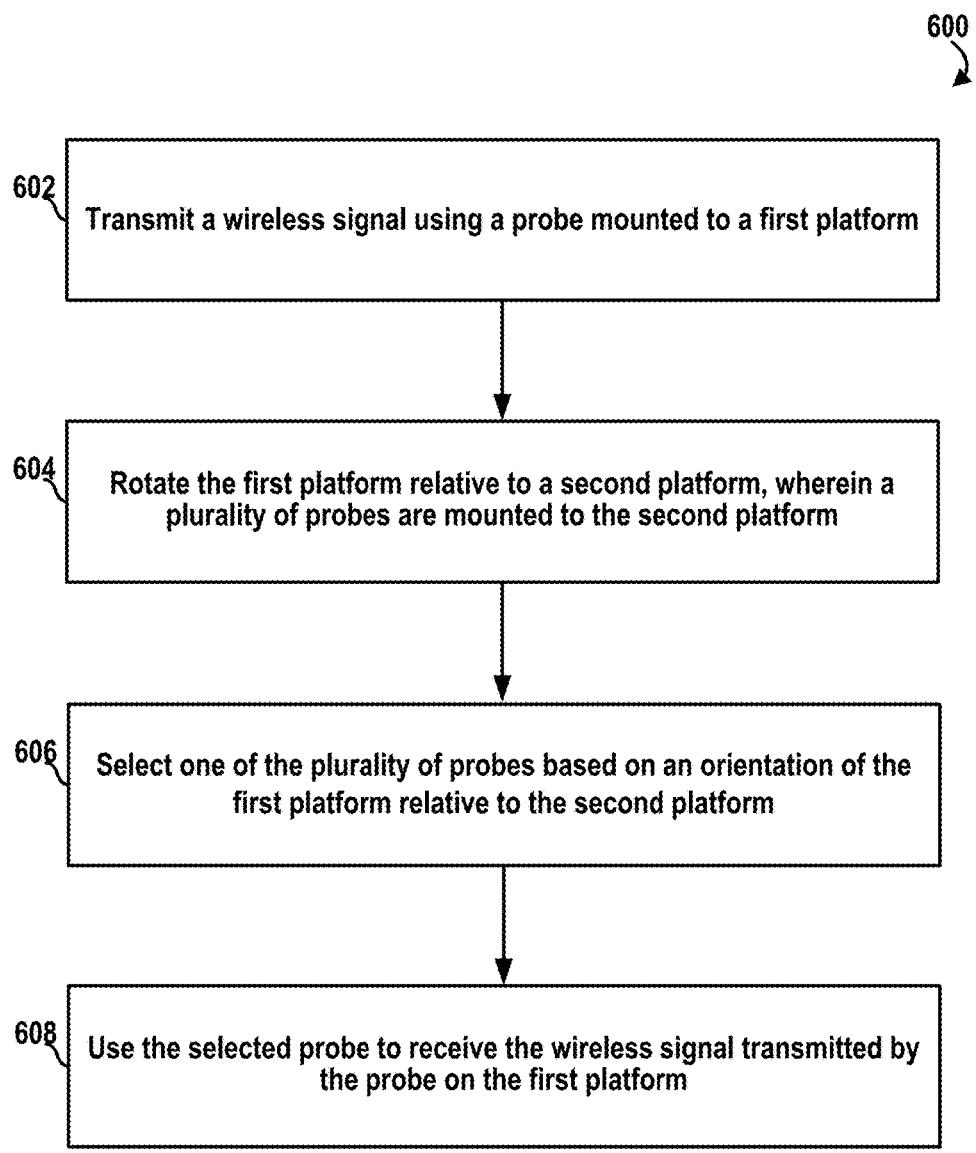
FIG. 6 is a flowchart of a method, according to an example embodiment.

FIG. 6 is a flowchart of a method 600, according to an example embodiment. Method 600 shown in FIG. 6 presents an embodiment of a method that could be used with any of the vehicles 100, 200, the LIDARs 120, 122, 130, 300, and/or the devices 400, 500, for example. Method 600 may include one or more operations, functions, or actions as illustrated by one or more of blocks 602-606. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 600 and other processes and methods disclosed herein, each block in FIG. 6 may represent circuitry that is wired to perform the specific logical functions in the process.

At block 602, the method 600 involves transmitting a wireless signal using a probe mounted to a first platform having a first side. Referring back to FIG. 5A by way of example, the wireless signal may be transmitted by probe 536 mounted to first side 530a of platform 530. Further, the wireless signal transmitted at block 602 may be toward a second side of a second platform positioned within a predetermined distance to the first side of the first platform.

Continuing with the example of FIG. 5A, the wireless signal transmitted by probe 536 could be transmitted toward the second side 540a of the platform 540 that is positioned within the predetermined distance 550 to the platform 530. Further, a plurality of probes could be mounted to the second platform (e.g., probes 510-512 of FIG. 5).

In some examples, the method 600 may also involve receiving data from a sensor, and modulating the wireless signal to indicate the data from the sensor. For example, referring back to FIG. 4, the data from the sensor 432 may be received by controller 434, which may then operate a probe 436 to modulate the transmitted wireless signal 402 such that the wireless signal 402 is indicative of the data from the sensor (e.g., frequency modulation, amplitude modulation, etc.).

In some examples, the method 600 may also involve receiving operation instructions for a device coupled to the second platform, and modulating the wireless signal to indicate the operation instructions. For example, referring back to FIG. 4, a controller (e.g., controller 444) may receive operating instructions for a device (e.g., sensor(s) 442, actuator 410, etc.), and may thereby operate a probe (e.g., probe 446) to modulate the transmitted wireless signal 402 to indicate such instructions for receipt by another probe (e.g., probe(s) 448).

At block 604, the method 600 involves rotating the first platform relative to the second platform such that the first side of the first platform remains within the predetermined distance to the second side of the second platform in response to the rotating. Continuing with the example of FIG. 5A, the first platform 530 could be rotated about the axis 502 to the orientation shown in FIG. 5B.

At block 606, the method 600 involves selecting one of the plurality of probes on the second platform based on an orientation of the first platform relative to the second platform. Further, at block 608, the method 600 involves using the selected probe to receive the wireless signal transmitted by the probe on the first platform. For example, in FIG. 5A, the probe 512 could be selected for wireless communication with probe 536 based on the orientation of the platform 530 shown in FIG. 5A, whereas in FIG. 5B, the probe 510 could be selected instead based on the orientation of the platform 430 shown in FIG. 5B.

In some examples, the method 600 may involve using the selected probe of the second platform to transmit a second wireless signal toward the first side of the first platform, and receiving the second wireless signal using the probe of the first platform. For example, referring back to FIG. 5A, signal conditioner 546 may receive instructions to operate a sensor coupled to platform 530 (e.g., instructions from controller 444 to operate sensor 432 of FIG. 4). In this example, the selected probe (e.g., probe 512), could transmit the second wireless signal to toward first side 530a of platform 530. And probe 536 could then receive the modulated signal and provide it to a controller (e.g., controller 434 of FIG. 4) for demodulation and execution to operate the sensor (e.g., sensor 432 of FIG. 4).

In some examples, the method 600 may involve determining wireless signal strengths associated with the plurality of probes on the second platform, and then determining an indication of the orientation of the first platform relative to the second platform based on the determined wireless signal strengths, in line with the discussion above for FIGS. 5A and 5B.

Further, in some examples, the method 600 may involve transmitting a second wireless signal using a second probe mounted to the first platform toward the second side of the second platform. For example, referring back to FIG. 4, the first platform 430 may include a second probe 438, and thus, controller 434 could operate the second probe 438 to establish a wireless link with one of the probes 448 concurrently with a link established using the first probe 436. Thus, the wireless signals 402 may be associated with two wireless links, which could allow a significant increase in the data throughput between the two platforms 430 and 440.

Figure 7:
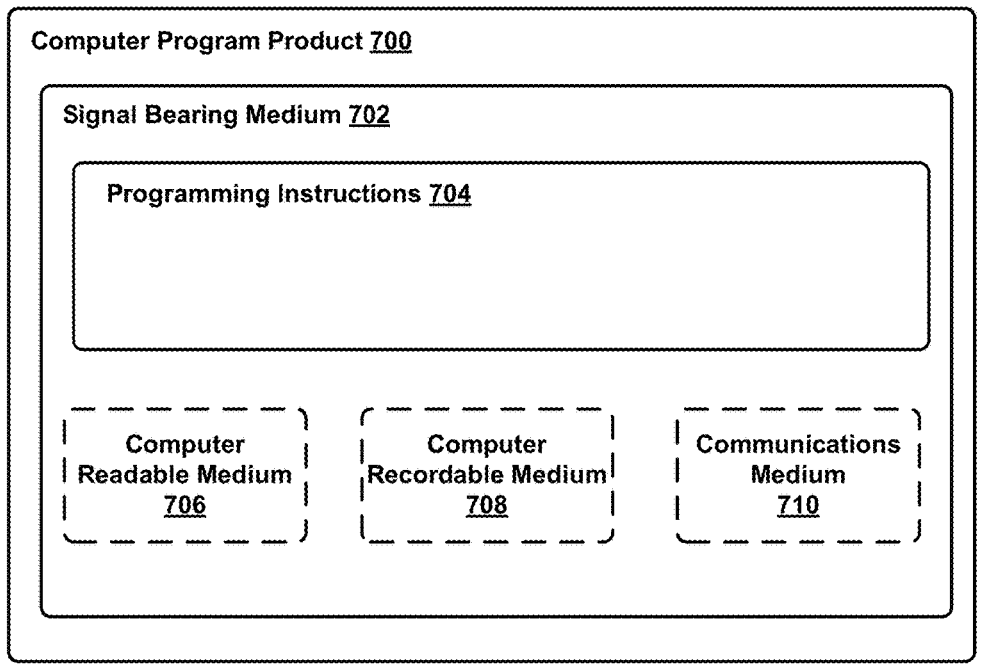
FIG. 7 depicts a computer readable medium configured according to an example embodiment.

FIG. 7 depicts a computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions, tasks, capabilities, etc., described above.

As noted above, in some embodiments, the disclosed techniques (e.g., method 600, etc.) may be implemented by computer program instructions encoded on a computer readable storage media in a machine-readable format, or on other media or articles of manufacture (e.g., instructions 216 of the vehicle 200, etc.). FIG. 7 is a schematic illustrating a conceptual partial view of an example computer program product that includes a computer program for executing a computer process on a computing device, arranged according to at least some embodiments disclosed herein.

In one embodiment, the example computer program product 700 is provided using a signal bearing medium 702. The signal bearing medium 702 may include one or more programming instructions 704 that, when executed by one or more processors may provide functionality or portions of the functionality described above with respect to FIGS. 1-6. In some examples, the signal bearing medium 702 may be a non-transitory computer-readable medium 706, such as, but not limited to, a hard disk drive, a Compact Disc (CD), a Digital Video Disk (DVD), a digital tape, memory, etc. In some implementations, the signal bearing medium 802 may be a computer recordable medium 708, such as, but not limited to, memory, read/write (R/W) CDs, R/W DVDs, etc. In some implementations, the signal bearing medium 702 may be a communication medium 710 (e.g., a fiber optic cable, a waveguide, a wired communications link, etc.). Thus, for example, the signal bearing medium 702 may be conveyed by a wireless form of the communications medium 710.

The one or more programming instructions 704 may be, for example, computer executable and/or logic implemented instructions. In some examples, a computing device may be configured to provide various operations, functions, or actions in response to the programming instructions 704 conveyed to the computing device by one or more of the computer readable medium 706, the computer recordable medium 708, and/or the communications medium 710.

The computer readable medium 706 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

V. CONCLUSION

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A device comprising:
    a first platform;
    a second platform within a predefined distance to the first platform;
    a probe mounted to the first platform;
    a plurality of probes mounted to the second platform; and
    a signal conditioner that selects, based on an orientation of the first platform relative to the second platform, one of the plurality of probes of the second platform for wireless communication with the probe of the first platform.

2. The device of claim 1, further comprising:
    an actuator that rotates the first platform or the second platform, wherein the first platform remains within the predefined distance to the second platform in response to the actuator rotating the first platform or the second platform.

3. The device of claim 1, further comprising:
    a second probe mounted to the first platform, wherein the signal conditioner selects, based on the orientation of the first platform relative to the second platform, another one of the plurality of probes on the second platform for wireless communication with the second probe of the first platform.

4. The device of claim 3, wherein the second probe is configured to emit a wireless signal toward the second platform, and wherein the signal conditioner is configured to use the other selected probe of the second platform to receive the wireless signal emitted by the second probe of the first platform.

5. The device of claim 1, wherein a first side of the first platform is within the predefined distance to a second side of the second platform opposite to the first side of the first platform.

6. The device of claim 1, wherein the plurality of probes of the second platform are arranged around an axis of rotation of the first platform or the second platform.

7. The device of claim 6, wherein the plurality of probes are within a particular distance to the axis of rotation.

8. The device of claim 7, wherein the probe of the first platform is within the particular distance to the axis of rotation.

9. The device of claim 1, wherein the probe of the first platform wirelessly communicates with the selected probe of the second platform using a radio-frequency (RF) signal in an extremely high frequency (EHF) band.

10. The device of claim 1, wherein the probe of the first platform wirelessly communicates with the selected probe of the second platform using a radio-frequency (RF) signal having at least one frequency greater than 3 Gigahertz.

11. The device of claim 1, further comprising one or more sensors that provide an indication of the orientation of the first platform relative to the second platform.

12. The device of claim 1, wherein the signal conditioner determines wireless signal strengths associated with the plurality of probes of the second platform, and wherein the signal conditioner determines an indication of the orientation of the first platform relative to the second platform based on the determined wireless signal strengths.

13. The device of claim 1, further comprising:
    a sensor;
    a first controller electrically coupled to the sensor and the probe of the first platform, wherein the first controller receives data from the sensor and causes the probe of the first platform to emit a modulated wireless signal based on the received data; and
    a second controller electrically coupled to the signal conditioner, wherein the second controller receives an indication of the modulated wireless signal from the selected probe via the signal conditioner, and wherein the second controller determines the data from the sensor based on the received indication.

14. A method comprising:
    transmitting, via a probe mounted to a first platform, a wireless signal toward a second platform, wherein a plurality of probes are mounted to the second platform;
    selecting one of the plurality of probes on the second platform based on an orientation of the first platform relative to the second platform; and
    using the selected probe to receive the wireless signal transmitted by the probe on the first platform.

15. The method of claim 14, further comprising:
    transmitting, via a second probe mounted to the first platform, a second wireless signal toward the second platform;
    selecting another one of the plurality of probes on the second platform based on the orientation of the first platform relative to the second platform; and
    using the other selected probe to receive the second wireless signal.

16. The method of claim 14, further comprising:
    receiving data from a sensor; and
    modulating the wireless signal to indicate the data from the sensor.

17. The method of claim 14, further comprising:
    transmitting, via the selected probe of the second platform, a second wireless signal toward the first platform; and
    receiving the second wireless signal using the probe of the first platform.

18. The method of claim 17, further comprising:
    receiving operation instructions for a device coupled to the first platform; and
    modulating the second wireless signal to indicate the operation instructions.

19. A non-transitory computer readable medium storing instructions that, when executed by one or more processors of a computing device, cause the computing device to perform operations comprising:
    transmitting, via a probe mounted to a rotor platform, a wireless signal toward a stator platform that mounts a plurality of probes;

selecting one of the plurality of probes in the stator platform based on an orientation of the rotor platform relative to the stator platform; and using the selected probe to receive the wireless signal transmitted by the probe in the rotor platform.

20. The non-transitory computer readable medium of claim 19, wherein the operations further comprise:

selecting another one of the plurality of probes in the stator platform based on the orientation of the first platform relative to the second platform;

while transmitting the wireless signal via the probe of the rotor platform, using the other selected probe in the stator platform to transmit a second wireless signal toward the rotor platform; and receiving, via a second probe mounted to the rotor platform, the second wireless signal.

* * * * *